US012804357B2

(12) United States Patent
Jiang

(10) Patent No.: US 12,804,357 B2
(45) Date of Patent: Nov. 17, 2026

(54) DATA RETRANSMISSION METHOD AND COMMUNICATION DEVICE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 444 days.

(21) Appl. No.: 18/268,542

(22) PCT Filed: Dec. 22, 2020

(86) PCT No.: PCT/CN2020/138389

§ 371 (c)(1),
(2) Date: Jun. 20, 2023

(87) PCT Pub. No.: WO2022/133743

PCT Pub. Date: Jun. 30, 2022

(65) Prior Publication Data

US 2024/0314522 A1 Sep. 19, 2024

(51) Int. Cl.
*H04W 4/06* (2009.01)
*H04W 72/11* (2023.01)
*H04W 76/18* (2018.01)

(52) U.S. Cl.
CPC .............. *H04W 4/06* (2013.01); *H04W 72/11* (2023.01); *H04W 76/18* (2018.02)

(58) Field of Classification Search
CPC ........ H04W 4/06; H04W 76/18; H04W 72/11
See application file for complete search history.

(56) References Cited

U.S. PATENT DOCUMENTS

| | | | | |
|---|---|---|---|---|
| 2023/0063082 | A1* | 3/2023 | Zhou | H04L 1/1864 |
| 2023/0299890 | A1* | 9/2023 | Baek | H04W 72/30 370/329 |
| 2023/0397232 | A1* | 12/2023 | Baek | H04W 72/30 |
| 2023/0403537 | A1* | 12/2023 | Chou | H04W 4/06 |
| 2025/0126679 | A1* | 4/2025 | Huang | H04L 12/189 |

FOREIGN PATENT DOCUMENTS

| | | |
|---|---|---|
| CN | 107241169 A | 10/2017 |
| CN | 108207036 A | 6/2018 |
| CN | 108540272 A | 9/2018 |

OTHER PUBLICATIONS

PCT/CN2020/138389, English translation of International Search Report dated Aug. 9, 2021, 2 pages.
VIVO "Discussion on mechanisms to support group scheduling for RRC_CONNECTED Ues" 3GPP TSG RAN WG1 #103-e, R1-2007691, Oct.-Nov. 2020, 7 pages.
European Patent Application No. 20966324.4 Office Action dated Jun. 30, 2026, 5 pages.

* cited by examiner

*Primary Examiner* — Rebecca E Song
*Assistant Examiner* — Shu Liu
(74) *Attorney, Agent, or Firm* — Cozen O'Connor

(57) ABSTRACT

A method for data retransmission method, performed by a UE, includes monitoring retransmission data scheduling of a multicast broadcast service (MBS) based on a designated retransmission identifier of the MBS. A method for data retransmission, performed by a base station, includes sending a retransmission identifier for indicating a UE to monitor retransmission data scheduling of an MBS, to the UE via SPS configuration information.

13 Claims, 6 Drawing Sheets

DATA RETRANSMISSION METHOD AND COMMUNICATION DEVICE

CROSS REFERENCE TO RELATED APPLICATION

This application is a US national phase application of International Application No. PCT/CN2020/138389, filed on Dec. 22, 2020, the entirety of which is hereby incorporated by reference.

TECHNICAL FIELD

The present disclosure relates to the field of wireless communication technologies, in particular to, a method for data retransmission, and a communication device.

BACKGROUND

In the wireless communication network referred to as the NR (New Radio) system, a base station may schedule and send an MBS (multicast broadcast service) by means of SPS (semi-persistent scheduling). However, when the base station sends MBS service data by means of the SPS, failure to receive service data may occur in a UE (user equipment), rendering a decrease in reliability of MBS data transmission.

SUMMARY

According to an aspect, an embodiment of the present disclosure provides a method for data retransmission, performed by a user equipment (UE). The method includes monitoring retransmission data scheduling of a multicast broadcast service (MBS) based on a designated retransmission identifier of the MBS.

According to another aspect, an embodiment of the present disclosure provides a method for data retransmission, performed by a base station. The method includes: sending a retransmission identifier for indicating a UE to monitor retransmission data scheduling of an MBS to the UE via SPS configuration information.

According to still another aspect, an embodiment of the present disclosure provides a communication device. The communication device includes: a transceiver; a memory; a processor, respectively coupled to the transceiver and the memory, and configured to control wireless signal transmission and reception of the transceiver by executing computer executable instructions on the memory, and capable of implementing: monitoring retransmission data scheduling of a multicast broadcast service (MBS) based on a designated retransmission identifier of the MBS.

Additional aspects and advantages of the present disclosure will be partially given in the following description, and some will become obvious from the following description, or be understood through practice of the present disclosure.

BRIEF DESCRIPTION OF THE DRAWINGS

The above-mentioned and/or additional aspects and advantages of the present disclosure will be apparent and readily understood from the following description of embodiments taken in conjunction with the accompanying drawings, in which.

DETAILED DESCRIPTION

Figure 1:
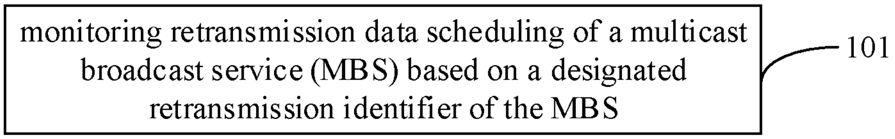
FIG. 1 is a flowchart illustrating a method for data retransmission performed by a user equipment (UE) according to an embodiment of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to the disclosure as recited in the appended claims.

Terms used herein in embodiments of the present disclosure are only for the purpose of describing specific embodiments, but should not be construed to limit the present disclosure. As used in the embodiments of the present disclosure and the appended claims, "a/an" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms.

These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

Embodiments of the present disclosure are described in detail below, examples of which are illustrated in the accompanying drawings. The same or similar reference numerals represent the same or similar elements throughout the descriptions. The embodiments described below with reference to the accompanying drawings are illustrative, are intended to explain the present disclosure and cannot be construed as limiting the present disclosure.

Embodiments of the present disclosure provide a method for data retransmission regarding the related art, in which a UE may fail to receive service data after a base station sent MBS service data by means of SPS, resulting in a decrease in reliability of MBS data transmission According to the method for data retransmission provided by embodiments of the present disclosure, with monitoring retransmission data scheduling of MBS based on a designated retransmission identifier of the MBS, the UE may monitor the retransmission data scheduling of the MBS based on the designated retransmission identifier of the MBS in an MBS service, thus achieving retransmission of MBS service data that fails to receive, improving reliability of data transmission.

A method for data retransmission, an apparatus, a communication device and a storage medium provided by the present disclosure are described in detail with reference to the accompany drawings below.

FIG. 1 is a flowchart illustrating a method for data retransmission according to an embodiment of the present disclosure. The method is performed by a UE.

As illustrated in FIG. 1, the method includes the following step.

At step 101, retransmission data scheduling of a multicast broadcast service (MBS) is monitored based on a designated retransmission identifier of the MBS.

It should be noted that the method for data retransmission of an embodiment of the present disclosure may be performed by any UE. The UE may refer to a device that provides voice and/or data connectivity to a user. The UE may communicate with one or more core networks through a radio access network (RAN). The UE may be an Internet of Things terminal, such as a sensor device, a mobile phone (or called as "cellular" phone), or a computer with the Internet of Things terminal, which may be, for example, a fixed, portable, pocket, handheld, computer built-in, or vehicle mounted device, such as, a station (STA), a subscriber unit, a subscriber station, a mobile station, a mobile platform, a remote station, an access point, a remote terminal, an access terminal, a user terminal, or a user agent. Alternatively, the UE may also be a device of unmanned aerial vehicle. Alternatively, the UE may also be a vehicle mounted device, such as a vehicle computer with wireless communication function or an external wireless terminal connected to the vehicle computer. Alternatively, the UE may also be a roadside device, such as a street light, a signal light, or other roadside device with wireless communication function.

The designated retransmission identifier of the MBS may include at least one of following identifiers: a unicast retransmission identifier or a multicast retransmission identifier.

The unicast retransmission identifier may be a CS-RNTI (Configured Scheduling-Radio Network Temporary Identity). The multicast retransmission identifier may be an M-CS-RNTI (Multicast-Configured Scheduling-Radio Network Temporary Identity).

In an embodiment of the present disclosure, the UE may monitor the retransmission data scheduling of the MBS based on the designated retransmission identifier of the MBS, thus achieving retransmission of MBS service data that fails to receive, improving reliability of data transmission.

Further, the UE may determine the specified retransmission identifier of the MBS based on configuration information issued by a base station, and monitor the retransmission data scheduling of the MBS based on the specified retransmission identifier of the MBS. In a possible implementation of an embodiment of the present disclosure, prior to the above step 101, the method may further include:

determining the designated retransmission identifier of the MBS in response to obtained downlink semi-persistent scheduling (SPS) configuration information.

The SPS configuration information may include N pieces of MBS service identification information, where N is a positive integer.

The MBS service identification information may include at least one of following information: a carrier identifier corresponding to the MBS, a logical channel identifier (LCID), a cell group identifier, a wireless link control entity identifier, an MBS scheduling identifier, or an MBS service identifier.

The MBS service identifier may include at least one of following information: a TMGI (temporary mobile group identity), an MBS session identity, an MBS business flow identity.

In an embodiment of the present disclosure, the base station may configure the UE with a method for data retransmission of multicast SPS corresponding to the MBS in response to scheduling MBS by means of the SPS.

As a possible implementation, the base station may configure N multicast SPSs in each cell with respective multicast scheduling identifiers of retransmission data scheduling for the multicast SPSs through the SPS configuration information. Therefore, in response to the SPS configuration information obtained, the UE may monitor the retransmission data scheduling of each service based on the multicast scheduling identifier corresponding to the SPS configured for each service in the MBS.

For example, the base station has configured SPS-1 (such as SPS-1 activated by a PDCCH (Physical Downlink Control Channel) indicated by a multicast scheduling identifier M-CS-RNTI-1) for MBS service-1 in BWP-1 (Bandwidth Part) of cell-1, and SPS-2 (such as SPS-2 activated by a PDCCH indicated by a multicast scheduling identifier M-CS-RNTI-2) for MBS service-2 in BWP-1 of cell-1. Therefore, the UE may take M-CS-RNTI-1 as a multicast retransmission identifier corresponding to MBS service-1, configured for monitoring the data retransmission scheduling of multicast SPS-1, and take M-CS-RNTI-2 as a multicast retransmission identifier corresponding to MBS service-2, configured for monitoring the data retransmission scheduling of multicast SPS-2.

As another possible implementation, the base station may configure N multicast SPSs in each cell with one multicast scheduling identifier of retransmission data scheduling for the multicast SPSs through the SPS configuration information. Therefore, in response to the SPS configuration information obtained, the UE may monitor the retransmission data scheduling of all services of the cell based on the multicast scheduling identifier corresponding to the cell.

For example, the base station configured SPS-1 (such as SPS-1 activated by a PDCCH indicated by a multicast scheduling identifier M-CS-RNTI-1) for MBS service-1 in BWP-1 of cell 1, and SPS-2 (such as SPS-2 activated by a PDCCH indicated by a multicast scheduling identifier M-CS-RNTI-1) for MBS service-2 in BWP-1 of cell 1. Therefore, the UE may take M-CS-RNTI-1 as the multicast retransmission identifier corresponding to MBS service-1 and MBS service-2, configured for monitoring the data retransmission scheduling of multicast SPS-1 and multicast SPS-2, and not configured for the data retransmission scheduling of unicast SPS.

As another possible implementation, the base station may also configure for UE with a specific unicast scheduling identifier, which is configured to monitor the retransmission data scheduling of the multicast SPS, through the SPS configuration information. Therefore, in response to the SPS configuration information obtained, the UE may monitor the retransmission data scheduling of all services in the MBS based on the unicast scheduling identifier included in the SPS configuration information.

For example, the base station configured SPS-1 (such as SPS-1 activated by a PDCCH indicated by a multicast scheduling identifier M-CS-RNTI-1) for MBS service-1 in BWP-1 of cell 1, and SPS-2 (such as SPS-2 activated by a PDCCH indicated by a multicast scheduling identifier M-CS-RNTI-2) for MBS service-2 in BWP-1 of cell 1. At this point, the base station may also configure for cell-1 with one UE specific PDCCH channel indication identifier for the retransmission scheduling of the multicast SPS (such as a unicast scheduling identifier CS-RNTI). Thus, UE may monitor the data retransmission scheduling of multicast SPS-1 and multicast SPS-2 based on CS-RNTI. In addition, CS-RNTI may also be configured for data retransmission scheduling of unicast SPS in cell-1. For example, the base station has configured SPS-3 (such as SPS-3 activated by a PDCCH indicated by a unicast scheduling identifier CS-RNTI) for a unicast service in BWP-1 of cell-1, the UE may also monitor the data retransmission scheduling of unicast SPS-3 based on CS-RNTI.

As another possible implementation, the base station may also configure unicast scheduling identifier and multicast scheduling identifier for UE through the SPS configuration information, therefore, the UE may monitor retransmission data scheduling of the MBS based on both the unicast scheduling identifier and the multicast scheduling identifier.

Further, the UE may determine whether to monitor the retransmission data scheduling of the MBS based on the designated retransmission identifier of the MBS. That is, in a possible implementation of an embodiment of the present disclosure, the above step 101 may include:

in response to a failure to receive MBS data, monitoring the retransmission data scheduling of the MBS based on the designated retransmission identifier of the MBS; or in response to having been sent a message of failure to receive MBS data to a base station, monitoring the retransmission data scheduling of the MBS based on the designated retransmission identifier of the MBS; or in response to a current received data being MBS data, monitoring the retransmission data scheduling of the MBS based on the designated retransmission identifier of the MBS.

As a possible implementation method, the base station is required to perform data retransmission only when the UE fails to receive the MBS data. Therefore, in response to the failure to receive the MBS data, the UE may monitor the retransmission data scheduling of the MBS based on the designated retransmission identifier of the MBS, rendering the UE to timely obtain the retransmission data sent by the base station again when the UE fails to receive the MBS data.

For example, the base station has configured a unicast scheduling identifier CS-RNTI for data retransmission scheduling of multicast SPS, so that the UE may monitor the unicast scheduling identifier CS-RNTI of a PDCCH after failure to decode data received through HARQ (Hybrid Automatic Repeat ReQuest) process-1 on resource-1 of multicast SPS-1.

For another example, the base station has configured a multicast scheduling identifier M-CS-RNTI for data retransmission scheduling of multicast SPS, so that the UE may monitor the multicast scheduling identifier M-CS-RNTI of a PDCCH after failure to decode data received through HARQ process-1 on resource 1 of multicast SPS-1.

As another possible implementation, the UE may also monitor the retransmission data scheduling of the MBS when a period of failure to receive the MBS data reaches a certain period. That is, in a possible implementation of an embodiment of the present disclosure, in response to the failure to receive MBS data, monitoring the retransmission data scheduling of the MBS based on the designated retransmission identifier of the MBS includes:

in response to the failure to receive MBS data, monitoring the retransmission data scheduling of the MBS based on the designated retransmission identifier of the MBS, upon a period starting from a time point of the failure to receive data being equal to or greater than a predetermined period.

For example, the base station has configured a unicast scheduling identifier CS-RNTI for data retransmission scheduling of multicast SPS. A predetermined period configured by a network is t1, and UE fails to decode data received through HARQ (Hybrid Automatic Repeat ReQuest) process-1 on resource-1 of multicast SPS-1 at time point t. Therefore, the UE can monitor the unicast scheduling identifier CS-RNTI of the PDCCH after time point t+t1.

For another example, the base station has configured a multicast scheduling identifier M-CS-RNTI for data retransmission scheduling of multicast SPS. A predetermined period configured by a network is t1, and the UE fails to decode data received through HARQ process-1 on resource-1 of multicast SPS-1 at time point t. Therefore, Therefore, the UE can monitor the multicast scheduling identifier M-CS-RNTI of the PDCCH after time t+t1.

As another possible implementation, in response to the failure to receive MBS data, the UE may send a data reception failure message to the base station, and the data reception failure message indicates the base station to perform data retransmission. Therefore, the UE may also monitor the retransmission data scheduling of the MBS based on the specified retransmission identifier of the MBS after failure to receive MBS data and having been sent MBS data reception failure message to the base station, rendering the UE to timely obtain the retransmission data sent by the base station again according to the MBS data reception failure message.

For example, the base station has configured a unicast scheduling identifier CS-RNTI for data retransmission scheduling of multicast SPS-1, the UE may monitor unicast scheduling identifier CS-RNTI of a PDCCH after failure to decode data received through HARQ process-1 on resource 1 of multicast SPS-1 and having been sent HARQ NACK (Negative-Acknowledgment) feedback message to the base station.

For another example, the base station has configured a multicast scheduling identifier M-CS-RNTI for data retransmission scheduling of multicast SPS, the UE may monitor multicast scheduling identifier M-CS-RNTI of a PDCCH after failure to decode data received through HARQ process-1 on resource-1 of multicast SPS-1 and having been sent HARQ NACK feedback information to the base station.

As another possible implementation, the UE may also monitor retransmission data scheduling of the MBS based on the specified retransmission identifier of the MBS during a process of receiving the MBS data.

For example, the base station has configured a unicast scheduling identifier CS-RNTI for data retransmission scheduling of multicast SPS, the UE may continuously monitor the unicast scheduling identifier CS-RNTI of a PDCCH during a process of receiving data of MBS service-1 through multicast SPS-1.

For another example, the base station has configured a multicast scheduling identifier M-CS-RNTI for data retransmission scheduling of multicast SPS, the UE may continuously monitor the multicast scheduling identifier M-CS-RNTI of a PDCCH during a process of receiving data of MBS service-1 through multicast SPS-1.

According to the method for data retransmission provided by embodiments of the present disclosure, with monitoring the retransmission data scheduling of the MBS based on the designated retransmission identifier of the MBS, the UE may monitor the retransmission data scheduling of the MBS based on the designated retransmission identifier of the MBS in the MBS service, thus achieving retransmission of MBS service data that fails to receive, improving reliability of data transmission.

In a possible implementation of the present disclosure, the UE may, in response to the designated retransmission identifier of the MBS including both the unicast retransmission identifier and the multicast retransmission identifier, monitor the retransmission data scheduling of the MBS based on any one of the unicast retransmission identifier and the multicast retransmission identifier to avoid repeated reception of retransmission data.

Figure 2:
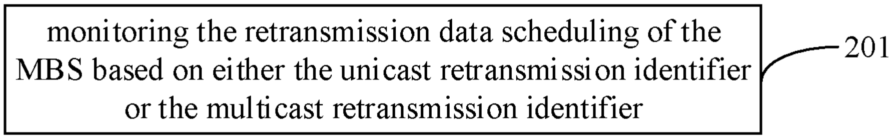
FIG. 2 is a flowchart illustrating another method for data retransmission according to an embodiment of the present disclosure.

In combination with FIG. 2, the following further describes another method for data retransmission according to an embodiment of the present disclosure.

FIG. 2 is a flowchart illustrating another method for data retransmission according to an embodiment of the present disclosure. The method is performed by a UE.

As illustrated in FIG. 2, the method for data retransmission includes the following step.

At step 201, the retransmission data scheduling of the MBS is monitored based on either the unicast retransmission identifier or the multicast retransmission identifier.

In an embodiment of the present disclosure, the UE may, in response to the specified retransmission identifier of the MBS including both the unicast retransmission identifier and the multicast retransmission identifier, monitor the retransmission data scheduling of the MBS based on any one of the unicast retransmission identifier and the multicast retransmission identifier.

As a possible implementation, the UE may select the multicast scheduling identifier as a basis for monitoring the retransmission data scheduling of the MBS. For example, the UE receives data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively, the UE may select to receive retransmission data scheduled by the PDCCH indicated by M-CS-RNTI-1.

As another possible implementation, the UE may select the unicast scheduling identifier as a basis for monitoring the retransmission data scheduling of the MBS. For example, the UE receives data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively, the UE may select to receive retransmission data scheduled by the PDCCH indicated by CS-RNTI-1.

In embodiments of the present disclosure, the step 201 may be implemented in any of the various embodiments of the present disclosure, which will not be limited in embodiments of the present disclosure, and will not be repeated hereinafter.

According to the method for data retransmission provided by embodiments of the present disclosure, the retransmission data scheduling of the MBS is monitored based on any one of the unicast retransmission identifier and the multicast retransmission identifier. Therefore, when the designated retransmission identifier of the MBS includes both the unicast retransmission identifier and the multicast retransmission identifier, the UE may select any one of the retransmission identifiers to monitor the retransmission data scheduling of the MBS, which may not only achieve retransmission of MBS service data that fails to receive, and improve reliability of data transmission, but also avoid repeated reception of retransmission data and reduce data processing capacity of the UE.

In a possible implementation of the present disclosure, the UE may, in response to the designated retransmission identifier of the MBS including both the unicast retransmission identifier and the multicast retransmission identifier, select one of the retransmission identifiers to monitor the retransmission data scheduling of the MBS based on reception time points of the retransmission scheduling indications corresponding to the two retransmission identifiers, thus avoiding repeated reception of retransmission data.

Figure 3:
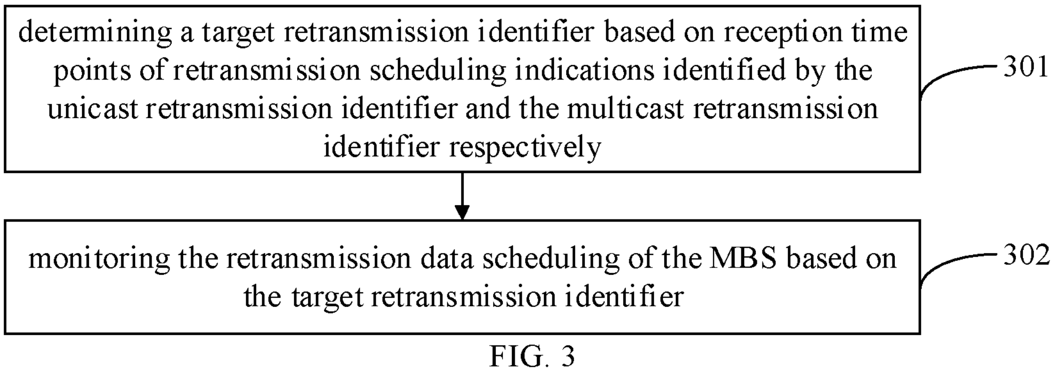
FIG. 3 is a flowchart illustrating yet another method for data retransmission according to an embodiment of the present disclosure.

In combination with FIG. 3, the following further describes yet another method for data retransmission according to an embodiment of the present disclosure.

FIG. 3 is a flowchart illustrating yet another method for data retransmission according to an embodiment of the present disclosure. The method is performed by a UE.

As illustrated in FIG. 3, the method for data retransmission includes the following steps.

At step 301, a target retransmission identifier is determined based on reception time points of retransmission scheduling indications identified by the unicast retransmission identifier and the multicast retransmission identifier respectively.

At step 302, the retransmission data scheduling of the MBS is monitored based on the target retransmission identifier.

As a possible implementation, the UE may determine a retransmission identifier with an earlier reception time point of the retransmission scheduling indication as the target retransmission identifier, and monitor the retransmission data scheduling of the MBS based on the PDCCH of the target retransmission identifier.

For example, the UE may receive data through HARQ process-1 of SPS-1, then receives two data retransmission scheduling indications for HARQ process-1 through a PDCCH indicated by a multicast scheduling identifier M-CS-RNTI-1 and a PDCCH indicated by a unicast scheduling identifier CS-RNTI, and a reception time point of the PDCCH indicated by M-CS-RNTI-1 is earlier than a reception time point of the PDCCH indicated by CS-RNTI-1, thus the UE may select to receive retransmission data scheduled by the PDCCH indicated by M-CS-RNTI-1.

In embodiments of the present disclosure, the step 301 may be implemented in any of the various embodiments of the present disclosure, which will not be limited in embodiments of the present disclosure, and will not be repeated hereinafter.

According to the method for data retransmission provided by embodiments of the present disclosure, the target retransmission identifier is determined based on the reception time points of the retransmission scheduling indications identified by the unicast retransmission identifier and the multicast retransmission identifier respectively, and the retransmission data scheduling of the MBS is monitored based on the target retransmission identifier. Therefore, when the designated retransmission identifier of the MBS includes both the unicast retransmission identifier and the multicast retransmission identifier, the UE may select the retransmission identifier with the earlier reception time point of the retransmission scheduling indication to monitor the retransmission data scheduling of the MBS, which may not only achieve retransmission of MBS service data that fails to receive, and improve reliability of data transmission, but also avoid repeated reception of retransmission data and reduce data processing capacity of the UE.

In a possible implementation of the present disclosure, the UE may, in response to the designated retransmission identifier of the MBS including both the unicast retransmission identifier and the multicast retransmission identifier, select one of the retransmission identifiers to monitor the retransmission data scheduling of the MBS based on reception time points of retransmission data corresponding to the two retransmission identifiers, thus avoiding repeated reception of retransmission data.

Figure 4:
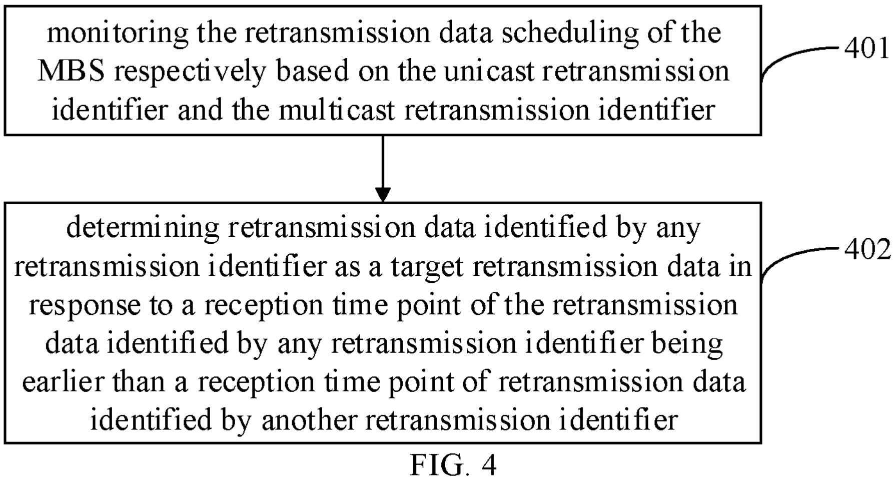
FIG. 4 is a flowchart illustrating still another method for data retransmission according to an embodiment of the present disclosure.

In combination with FIG. 4, the following further describes still another method for data retransmission according to an embodiment of the present disclosure.

FIG. 4 is a flowchart illustrating still another method for data retransmission according to an embodiment of the present disclosure. The method is performed by a UE.

As illustrated in FIG. 4, the method for data retransmission includes the following steps.

At step 401, the retransmission data scheduling of the MBS is monitored based on the unicast retransmission identifier and the multicast retransmission identifier respectively.

At step 402, retransmission data identified by any retransmission identifier is determined as a target retransmission data in response to a reception time point of the retransmission data identified by any retransmission identifier being earlier than a reception time point of retransmission data identified by another retransmission identifier.

As a possible implementation, the UE may, in response to the designated retransmission identifier of the MBS including both the unicast retransmission identifier and the multicast retransmission identifier, monitor the retransmission data scheduling of the MBS based on the unicast retransmission identifier and the multicast retransmission identifier simultaneously. The UE may, in response to receiving retransmission data identified by two retransmission identifiers, determine retransmission data with an earlier reception time point as the target retransmission data, that is, receive the target retransmission data.

For example, the UE may receive data through HARQ process-1 of SPS-1, then receives two data retransmission scheduling indications for HARQ process-1 through a PDCCH indicated by a multicast scheduling identifier M-CS-RNTI-1 and a PDCCH indicated by a unicast scheduling identifier CS-RNTI, and a reception time point of a PDSCH (Physical Downlink Shared Channel) scheduled by the PDCCH indicated by M-CS-RNTI-1 is earlier than a reception time point of a PDSCH scheduled by the PDCCH indicated by CS-RNTI-1, thus the UE may select to receive retransmission data scheduled by the PDCCH indicated by M-CS-RNTI-1.

In embodiments of the present disclosure, the steps 401-402 may be implemented in any of the various embodiments of the present disclosure, which will not be limited in embodiments of the present disclosure, and will not be repeated hereinafter.

According to the method for data retransmission provided by embodiments of the present disclosure, the retransmission data scheduling of the MBS is monitored based on the unicast retransmission identifier and the multicast retransmission identifier respectively, and the retransmission data identified by any retransmission identifier is determined as the target retransmission data in response to the reception time point of the retransmission data identified by any retransmission identifier being earlier than the reception time point of retransmission data identified by another retransmission identifier. Therefore, when the designated retransmission identifier of the MBS includes both the unicast retransmission identifier and the multicast retransmission identifier, the UE may select to receive the retransmission data with the earlier reception time point, which may not only achieve retransmission of MBS service data that fails to receive, and improve reliability of data transmission, but also avoid repeated reception of retransmission data and reduce data processing capacity of the UE.

In a possible implementation of the present disclosure, the UE may, in response to the designated retransmission identifier of the MBS including both the unicast retransmission identifier and the multicast retransmission identifier, perform combined decoding on retransmission data monitored based on two retransmission identifiers, thus improving reliability of reception of retransmission data.

Figure 5:
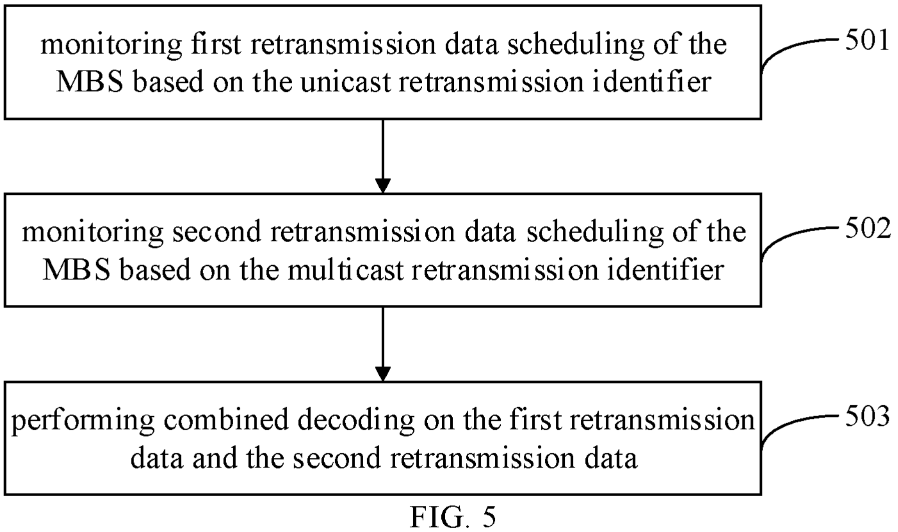
FIG. 5 is a flowchart illustrating still another method for data retransmission according to an embodiment of the present disclosure.

In combination with FIG. 5, the following further describes still another method for data retransmission according to an embodiment of the present disclosure.

FIG. 5 is a flowchart illustrating still another method for data retransmission according to an embodiment of the present disclosure. The method is performed by a UE.

As illustrated in FIG. 5, the method for data retransmission includes the following steps.

At step 501, first retransmission data scheduling of the MBS is monitored based on the unicast retransmission identifier.

At step 502, second retransmission data scheduling of the MBS is monitored based on the multicast retransmission identifier.

In an embodiment of the present disclosure, the UE may, in response to the designated retransmission identifier of the MBS including both the unicast retransmission identifier and the multicast retransmission identifier, monitor the retransmission data scheduling of the MBS based on the unicast retransmission identifier and the multicast retransmission identifier simultaneously, thus improving accuracy of reception of retransmission data. Therefore, the UE may monitor the first retransmission data scheduling of the MBS based on the unicast retransmission identifier to obtain first retransmission data sent by a base station from a PDCCH indicated by the unicast scheduling identifier. The UE may monitor the second retransmission data scheduling of the MBS based on the multicast retransmission identifier to obtain the second retransmission data sent by the base station from a PDCCH indicated by the multicast scheduling identifier.

At step 503, combined decoding is performed on the first retransmission data and the second retransmission data.

In an embodiment of the present disclosure, when monitoring the retransmission data scheduling of the MBS through both the unicast scheduling identifier and the multicast scheduling identifier, the UE may perform the combined decoding one the first retransmission data identified by the first retransmission data scheduling and the second retransmission data identified by the second retransmission data scheduling, so that when retransmission data indicated by one retransmission identifier is not successfully received, retransmission data can also be successfully received through another retransmission identifier, which may improve reliability of reception of retransmission data.

In embodiments of the present disclosure, the steps 501-503 may be implemented in any of the various embodiments of the present disclosure, which will not be limited in embodiments of the present disclosure, and will not be repeated hereinafter.

According to the method for data retransmission provided by embodiments of the present disclosure, the first retransmission data scheduling of the MBS is monitored based on the unicast retransmission identifier, the second retransmission data scheduling of the MBS is monitored based on the multicast retransmission identifier, and further the combined decoding is performed on the first retransmission data and the second retransmission data. Therefore, when the designated retransmission identifier of the MBS includes both the unicast retransmission identifier and the multicast retransmission identifier, the UE may perform the combined decoding on the retransmission data monitored based on two retransmission identifiers, which may not only achieve retransmission of MBS service data that fails to receive, but also further improve reliability of data transmission.

In a possible implementation of the present disclosure, the UE may, in response to the designated retransmission identifier of the MBS including both the unicast retransmission identifier and the multicast retransmission identifier, directly receive successful decoded retransmission data, thus not only improving reliability of reception of retransmission data, but also avoiding repeated reception of retransmission data.

Figure 6:
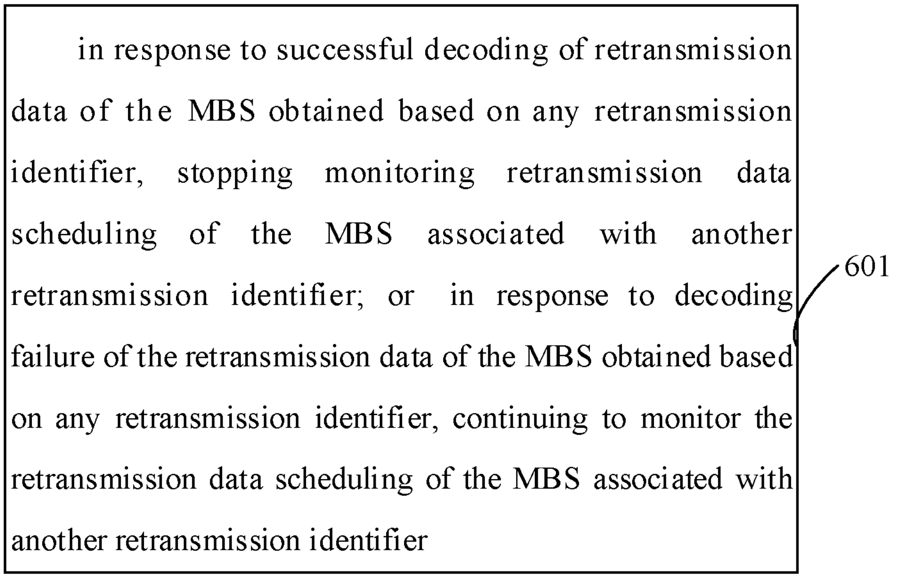
FIG. 6 is a flowchart illustrating another method for data retransmission according to an embodiment of the present disclosure.

In combination with FIG. 6, the following further describes another method for data retransmission according to an embodiment of the present disclosure.

FIG. 6 is a flowchart illustrating another method for data retransmission according to an embodiment of the present disclosure. The method is performed by a UE.

As illustrated in FIG. 6, the method for data retransmission includes the following step.

At step 601, in response to successful decoding of retransmission data of the MBS obtained based on any retransmission identifier, retransmission data scheduling of the MBS associated with another retransmission identifier stops to be monitored; or in response to decoding failure of the retransmission data of the MBS obtained based on any retransmission identifier, the retransmission data scheduling of the MBS associated with another retransmission identifier continues to be monitored.

In an embodiment of the present disclosure, the UE may, in response to the designated retransmission identifier of the MBS including both the unicast retransmission identifier and the multicast retransmission identifier, monitor the retransmission data scheduling of the MBS based on the unicast retransmission identifier and the multicast retransmission identifier sequentially. The UE may not receive second retransmission data in response to the successful decoding of first retransmission data received. Correspondingly, the UE may continue to receive the second retransmission data in response to the decoding failure of the first retransmission data received.

For example, the UE receives data through HARQ process-1 of SPS-1, and then receives two data retransmission scheduling indications for HARQ process-1 through a PDCCH indicated by a multicast scheduling identifier M-CS-RNTI-1 and a PDCCH indicated by a unicast scheduling identifier CS-RNTI. Based on a processing order (or an order of reception time points), the UE successfully decodes retransmission data scheduled by the PDCCH indicated by M-CS-RNTI-1, and then does not receive retransmission data scheduled by the PDCCH indicated by CS-RNTI. For example, the UE may discard the retransmission data scheduled by the PDCCH indicated by CS-RNTI. Otherwise, the UE may continue to receive retransmission data scheduled by the PDCCH indicated by CS-RNTI.

In embodiments of the present disclosure, the step 601 may be implemented in any of the various embodiments of the present disclosure, which will not be limited in embodiments of the present disclosure, and will not be repeated hereinafter.

According to the method for data retransmission provided by embodiments of the present disclosure, the UE, in response to the successful decoding of retransmission data of the MBS obtained based on any retransmission identifier, stops to be monitor the retransmission data scheduling of the MBS associated with another retransmission identifier; or in response to the decoding failure of the retransmission data of the MBS obtained based on any retransmission identifier, continue to be monitor the retransmission data scheduling of the MBS associated with another retransmission identifier. Therefore, when the designated retransmission identifier of the MBS includes both the unicast retransmission identifier and the multicast retransmission identifier, the UE may directly receive successful decoded retransmission data, which may not only achieve retransmission of MBS service data that fails to receive, further improve reliability of data transmission, but also avoid repeated reception of retransmission data and reduce data processing capacity of the UE.

In a possible implementation of the present disclosure, the UE may further send an indication message of reception of retransmission data to a base station based on a decoding state of the retransmission data, such that the base station may timely understand a reception state of the UE for the retransmission data and further improve reliability of data transmission.

Figure 7:
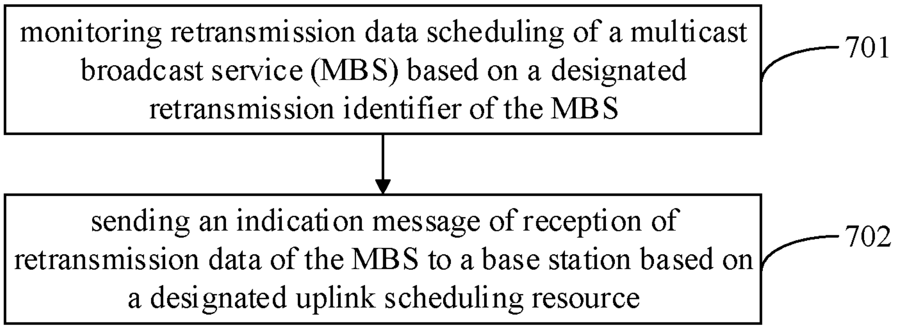
FIG. 7 is a flowchart illustrating yet another method for data retransmission according to an embodiment of the present disclosure.

In combination with FIG. 7, the following further describes still another method for data retransmission according to an embodiment of the present disclosure.

FIG. 7 is a flowchart illustrating still another method for data retransmission according to an embodiment of the present disclosure. The method is performed by a UE.

As illustrated in FIG. 4, the method for data retransmission includes the following steps.

At step 701, retransmission data scheduling of an MBS is monitored based on a designated retransmission identifier of the MBS.

In embodiments of the present disclosure, the step 701 may be implemented in any of the various embodiments of the present disclosure, which will not be limited in embodiments of the present disclosure, and will not be repeated hereinafter.

At step 702, an indication message of reception of retransmission data of the MBS is sent to a base station based on a designated uplink scheduling resource.

In response to the designated retransmission identifier of the MBS being a unicast retransmission identifier, the designated uplink scheduling resource may be an uplink scheduling resource corresponding to the unicast retransmission identifier.

In response to the designated retransmission identifier of the MBS being a multicast retransmission identifier, the designated uplink scheduling resource may be an uplink scheduling resource corresponding to the multicast retransmission identifier.

In response to the designated retransmission identifier of the MBS including the unicast retransmission identifier and the multicast retransmission identifier, the designated uplink scheduling resource may be a feedback resource corresponding to any one of the retransmission identifiers, that is, the designated uplink scheduling resource may be the uplink scheduling resource corresponding to the unicast retransmission identifier, or the uplink scheduling resource corresponding to the multicast retransmission identifier.

As a possible implementation, in response to the designated retransmission identifier of the MBS including the unicast retransmission identifier and the multicast retransmission identifier, an uplink scheduling resource corresponding to one of the retransmission identifiers may be determined as the designated uplink scheduling resource by the following methods.

Method 1

The designated uplink scheduling resource is determined based on an order of receiving scheduling indications identified by the unicast retransmission identifier and the multicast retransmission identifier respectively.

As an example, the UE may determine an uplink scheduling resource that corresponds to a retransmission identifier corresponding to a scheduling indication received first as the designated uplink scheduling resource. For example, the UE receives data through HARQ process-1 of SPS-1, and then receives two data retransmission scheduling indications for HARQ process-1 through a PDCCH indicated by a multicast scheduling identifier M-CS-RNTI-1 and a PDCCH indicated by a unicast scheduling identifier CS-RNTI. The base station has configured an uplink scheduling resource PUCCH-1 (Physical Uplink Control Channel) for reception of PDSCH-1 scheduled by the PDCCH indicated by M-CS-RNTI-1, and an uplink scheduling resource PUCCH-2 for reception of PDSCH-2 scheduled by the PDCCH indicated by CS-RNTI-1, and PUCCH-1 is received prior to PUCCH-2 in order, the UE may take PUCCH-1 as the designated uplink scheduling resource for sending the indication message of reception of retransmission data of the MBS, while ignore feedback on PUCCH-2.

Method 2

An uplink scheduling resource corresponding to a retransmission identifier associated with successfully decoded retransmission data is determined as the designated uplink scheduling resource.

For example, the UE may receive data through HARQ process-1 of SPS-1, and then then receives a data retransmission scheduling indication for the HARQ process-1 through a PDCCH indicated by a multicast scheduling identifier M-CS-RNTI-1. According to a processing order (or an order of reception times), the UE receives the retransmission data scheduled by the PDCCH indicated by CS-RNTI-1 after combined decoding of the retransmission data scheduled by the PDCCH indicated by M-CS-RNTI-1 that is received by the UE fails. After combined decoding of the retransmission data scheduled by the PDCCH indicated by CS-RNTI-1 for PDCCH scheduling is successful, the UE may take a PUCCH resource corresponding to the retransmission data scheduled by the PDCCH indicated by CS-RNTI-1 as the designated uplink scheduling resource, while ignore feedback of a PUCCH resource corresponding to the retransmission data scheduled by the PDCCH indicated by M-CS-RNTI-1.

Method 3

An uplink scheduling resource corresponding to any retransmission identifier is determined as the designated uplink scheduling resource in response to successful decoding of retransmission data identified by any retransmission identifier and a reception time of the retransmission data identified by any retransmission identifier being earlier than a reception time of retransmission data identified by another retransmission identifier.

For example, the UE may receive data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively. The base station has configured the uplink scheduling resource PUCCH-1 for reception of PDSCH-1 scheduled by the PDCCH indicated by M-CS-RNTI-1, and the uplink scheduling resource PUCCH-2 for reception of PDSCH-2 scheduled by the PDCCH indicated by CS-RNTI-1. The combined decoding is performed on PDSCH-1 and PDSCH-2 simultaneously and the decoding is successful. PDSCH-1 is retransmission data processed (or received) first in the aspect of time, the UE may determine PUCCH-1 corresponding to PDSCH-1 as the designated uplink scheduling resource, while ignore feedback from PUCCH-2 corresponding to PDSCH-2.

Method 4

An uplink scheduling resource corresponding to any retransmission identifier is determined as the designated uplink scheduling resource in response to successful decoding of retransmission data identified by any retransmission identifier and the reception time of the retransmission data identified by any retransmission identifier being later than the reception time of the retransmission data identified by another retransmission identifier.

For example, the UE may receive data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively. The base station has configured the uplink scheduling resource PUCCH-1 for reception of PDSCH-1 scheduled by the PDCCH indicated by M-CS-RNTI-1, and the uplink scheduling resource PUCCH-2 for reception of PDSCH-2 scheduled by the PDCCH indicated by CS-RNTI-1. The combined decoding is performed on PDSCH-1 and PDSCH-2 simultaneously and the decoding is successful. PDSCH-2 is retransmission data processed (or received) last in the aspect of time, the UE may determine PUCCH-2 corresponding to PDSCH-2 as the designated uplink scheduling resource, while ignore feedback from PUCCH-1 corresponding to PDSCH-1.

Method 5

An uplink scheduling resource corresponding to any retransmission identifier is determined as the designated uplink scheduling resource in response to decoding failure of retransmission data identified by any retransmission identifier and the reception time of the retransmission data identified by any retransmission identifier being earlier than the reception time of the retransmission data identified by another retransmission identifier.

For example, the UE may receive data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively. The base station has configured the uplink scheduling resource PUCCH-1 for reception of PDSCH-1 scheduled by the PDCCH indicated by M-CS-RNTI-1, and the uplink scheduling resource PUCCH-2 for reception of PDSCH-2 scheduled by the PDCCH indicated by CS-RNTI-1. The combined decoding is performed on PDSCH-1 and PDSCH-2 simultaneously and the decoding both fails. PDSCH-1 is retransmission data processed (or received) first in the aspect of time, the UE may determine PUCCH-1 corresponding to PDSCH-1 as the designated uplink scheduling resource, while ignore feedback from PUCCH-2 corresponding to PDSCH-2.

Method 6

An uplink scheduling resource corresponding to any retransmission identifier is determined as the designated uplink scheduling resource in response to decoding failure of retransmission data identified by any retransmission identifier and the reception time of the retransmission data identified by any retransmission identifier being later than the reception time of the retransmission data identified by another retransmission identifier.

For example, the UE may receive data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively. The base station has configured the uplink scheduling resource PUCCH-1 for reception of PDSCH-1 scheduled by the PDCCH indicated by M-CS-RNTI-1, and the uplink scheduling resource PUCCH-2 for reception of PDSCH-2 scheduled by the PDCCH indicated by CS-RNTI-1. The combined decoding is performed on PDSCH-1 and PDSCH-2 simultaneously and the decoding fails. PDSCH-2 is retransmission data processed (or received) last in the aspect of time, the UE may determine PUCCH-2 corresponding to PDSCH-2 as the designated uplink scheduling resource, while ignore feedback from PUCCH-1 corresponding to PDSCH-1.

Method 7

An uplink scheduling resource corresponding to any one of the retransmission identifiers is determined as the designated uplink scheduling resource.

For example, the UE may receive data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively. The base station has configured the uplink scheduling resource PUCCH-1 for reception of PDSCH-1 scheduled by the PDCCH indicated by M-CS-RNTI-1, and the uplink scheduling resource PUCCH-2 for reception of PDSCH-2 scheduled by the PDCCH indicated by CS-RNTI-1. The UE may determine the uplink scheduling resource PUCCH-1 corresponding to reception of PDSCH-1 scheduled by the PDCCH indicated by M-CS-RNTI-1 as the designated uplink scheduling resource, while ignore feedback from PUCCH-2 corresponding to PDSCH-2.

For another example, the UE may receive data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively. The base station has configured the uplink scheduling resource PUCCH-1 for reception of PDSCH-1 scheduled by the PDCCH indicated by M-CS-RNTI-1, and the uplink scheduling resource PUCCH-2 for reception of PDSCH-2 scheduled by the PDCCH indicated by CS-RNTI-1. The UE may determine the uplink scheduling resource PUCCH-2 corresponding to reception of PDSCH-2 scheduled by the PDCCH indicated by CS-RNTI-1 as the designated uplink scheduling resource, while ignore feedback from the uplink scheduling resource PUCCH-1 corresponding to reception of PDSCH-1 scheduled by the PDCCH indicated by M-CS-RNTI-1.

Further, the indication message of reception of retransmission data of the MBS may include at least one of an indication message indicating successful reception of MBS retransmitted data or an indication message indicating reception failure of retransmission data of the MBS. Therefore, the UE may determine the indication message of reception of the retransmission data of the MBS sent to the base station based on a reception result of the retransmission data. In a possible implementation of an embodiment of the present disclosure, the above step 701 may include:

- sending an indication message indicating successful reception of retransmitted data to the base station in response to successful decoding of at least one piece of retransmitted data; or
- sending an indication message indicating reception failure of the retransmission data to the base station in response to decoding failure of at least one piece of retransmission data; or
- sending an indication message indicating reception failure of the retransmission data to the base station in response to decoding failure of all retransmission data; or
- sending an indication message indicating successful reception of any retransmission data to the base station in response to successful decoding of any retransmission data; or
- sending an indication message indicating reception failure of any retransmission data to the base station in response to decoding failure of any retransmission data.

As an example, in response to monitoring data retransmission scheduling of the MBS through any one retransmission identifier, the UE may consider that the retransmission data is received successfully after decoding at least one received retransmission data successfully, and send the indication message indicating successful reception of the MBS retransmitted data to the base station. Correspondingly, the UE may send the indication message indicating reception failure of the retransmission data to the base station after failure to decode all retransmission data.

For example, the UE may receive data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively. According to a processing order (or an order of reception times), the UE may send an HARQ ACK (Acknowledgement) indication through the designated uplink scheduling resource after decoding of the retransmission data scheduled by the PDCCH indicated by M-CS-RNTI-1 that is received by UE is successful.

Correspondingly, according to the processing order (or the order of reception times), the UE may not send an HARQ NACK indication after decoding of the retransmission data scheduled by the PDCCH indicated by M-CS-RNTI-1 that is received by the UE fails. When the combined decoding of the retransmission data scheduled by PDCCH indicated by M-CS-RNTI-1 with the retransmission data scheduled by PDCCH indicated by CS-RNTI-1 that are received by the UE fails, the UE may send the HARQ NACK indication to the base station. The designated uplink scheduling resources may be determined according to any one of the above methods 1 to 7.

As an example, for the retransmission data corresponding to two retransmission identifiers, the UE may send the indication message indicating successful reception of MBS retransmitted data or the indication message indicating reception failure of retransmission data of the MBS based on reception states corresponding to two types of retransmission data respectively.

For example, the UE may receive data through HARQ process-1 of SPS-1, and then receives two data retransmission scheduling indications for the HARQ process-1 through a PDCCH indicated by a multicast scheduling identifier M-CS-RNTI-1 and a PDCCH indicated by a unicast scheduling identifier CS-RNTI respectively. According to a processing order (or an order of reception time points), the UE may send a HARQ NACK indication to the base station for the retransmission data scheduled by the PDCCH indicated by M-CS-RNTI-1 after decoding of the retransmission data scheduled by the PDCCH indicated by M-CS-RNTI-1 that is received by the UE fails. When the combined decoding of the received retransmission data scheduled by the PDCCH indicated by M-CS-RNTI-1 and the retransmission data scheduled by the PDCCH indicated by CS-RNTI-1 that are received by the UE is successful, the UE sends a HARQ ACK indication for the retransmission data scheduled by the PDCCH indicated by CS-RNTI-1.

Correspondingly, according to the processing order (or order of reception time points), the UE may send a HARQ NACK indication to the base station after the decoding of the retransmission data scheduled by the PDCCH indicated by M-CS-RNTI-1 that is received by the UE fails. When the combined decoding of the retransmission data scheduled by the PDCCH indicated by M-CS-RNTI-1 and the retransmission data scheduled by the PDCCH indicated by CS-RNTI-1 that are received by the UE is successful, the UE sends a HARQ NACK indication to the base station.

According to the method for data retransmission provided by embodiments of the present disclosure, the retransmission data scheduling of the MBS is monitored based on the designated retransmission identifier of the MBS, and the indication message of reception of retransmission data of the MBS is sent to the base station based on the designated uplink scheduling resource. Therefore, the UE sends the indication message of reception of the retransmission data to the base station based on the decoding state of the retransmission data, such that the base station may timely understand the reception state of the UE for the retransmission data, which may not only achieve retransmission of MBS service data that fails to receive, but also further improve reliability of data transmission.

In a possible implementation of the present disclosure, since the base station may configure a time position of the uplink scheduling resource to limit an available time of the uplink scheduling resource through the time position, the UE may further determine the designated uplink scheduling resource based on a processing time of the retransmission data and a time position of an uplink scheduling resource corresponding to each retransmission identifier, which may further improve reliability of data transmission.

Figure 8:
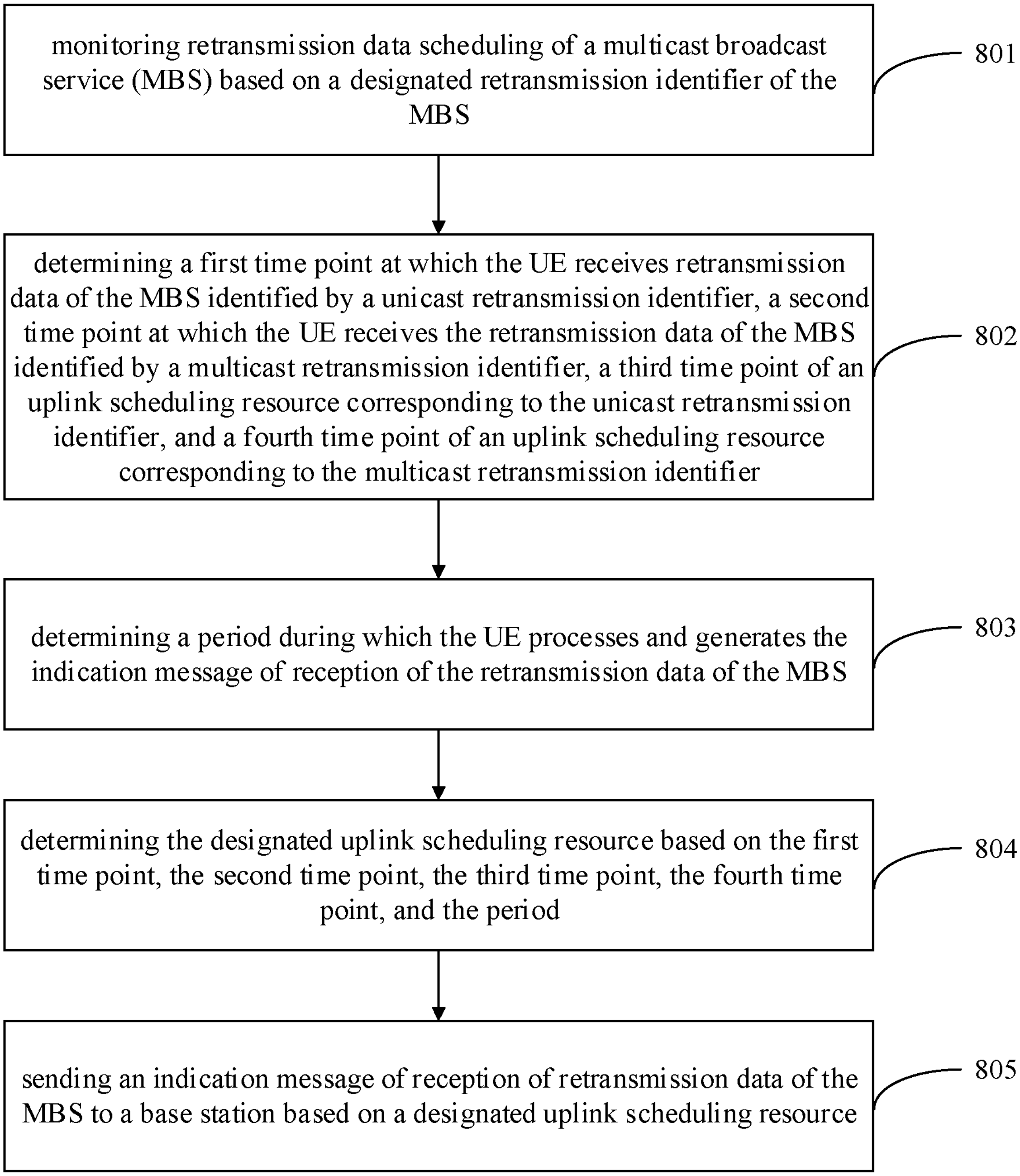
FIG. 8 is a flowchart illustrating still another method for data retransmission according to an embodiment of the present disclosure.

In combination with FIG. 8, the following further describes another method for data retransmission according to an embodiment of the present disclosure.

FIG. 8 is a flowchart illustrating another method for data retransmission according to an embodiment of the present disclosure. The method is performed by a UE.

As illustrated in FIG. 8, the method for data retransmission includes the following steps.

At step 801, retransmission data scheduling of an MBS is monitored based on a designated retransmission identifier of the MBS.

In embodiments of the present disclosure, the step 801 may be implemented in any of the various embodiments of the present disclosure, which will not be limited in embodiments of the present disclosure, and will not be repeated hereinafter.

At step 802, a first time point at which the UE receives retransmission data of the MBS identified by a unicast retransmission identifier, a second time point at which the UE receives the retransmission data of the MBS identified by a multicast retransmission identifier, a third time point of an uplink scheduling resource corresponding to the unicast retransmission identifier, and a fourth time point of an uplink scheduling resource corresponding to the multicast retransmission identifier are determined.

The first time point may be a time point when the UE receives the retransmission data of the MBS identified by the unicast retransmission identifier. The second time point may be a time point when the UE receives the retransmission data of the MBS identified by the multicast retransmission identifier. The third time point may indicate an available time limit of the uplink scheduling resource corresponding to the unicast retransmission identifier. The fourth time point may indicate an available time limit of the uplink scheduling resource corresponding to the multicast retransmission identifier.

In an embodiment of this present disclosure, during a process of monitoring the retransmission data scheduling of the MBS, the UE may record the first time point of receiving the retransmission data of the MBS identified by the unicast retransmission identifier, as well as the second time point of receiving the retransmission data of the MBS identified by the multicast retransmission identifier. Moreover, the UE may further also determine the third time point that corresponds to the uplink scheduling resource corresponding to the unicast retransmission identifier based on time position information of the uplink scheduling resource corresponding to the unicast retransmission identifier configured by the base station, and the fourth time point that corresponds to the uplink scheduling resource corresponding to the multicast retransmission identifier based on time position information of the uplink scheduling resource corresponding to the multicast retransmission identifier configured by the base station.

At step 803, a period during which the UE processes and generates the indication message of reception of the retransmission data of the MBS is determined.

In an embodiment of this present disclosure, after obtaining the retransmission data of the MBS identified by the unicast retransmission identifier or the retransmission data of the MBS identified by the multicast retransmission identifier, the UE may record a period during which the UE processes the indication message of reception of the retransmission data of the MBS and a period during which the UE generates the indication message of reception of the retransmission data of the MBS during processing the retransmission data.

At step 804, the designated uplink scheduling resource is determined based on the first time point, the second time point, the third time point, the fourth time point, and the period.

In an embodiment of this present disclosure, after determining the first time point, the second time point, the third time point, the fourth time point, and the period during which the UE processes and generates the indication message of reception of the retransmission data of the MBS, the UE may determines an uplink scheduling resource that are still available after generating the indication message of reception of the retransmission data of the MBS as the designated uplink scheduling resource.

Further, in response to the indication message of reception of the retransmission data of the MBS being generated based on a reception state of the retransmission data of the MBS corresponding to the unicast scheduling identifier, the above step 804 may include:

- determining an uplink scheduling resource corresponding to the unicast retransmission identifier as the designated uplink scheduling resource in response to a sum of the first time point and the period being less than or equal to the third time point; or
- determining an uplink scheduling resource corresponding to the multicast retransmission identifier as the designated uplink scheduling resource in response to a sum of the first time point and the period being less than or equal to the fourth time point.

As an example, in response to the sum of the first time point and the period being less than or equal to the third time point, and the sum of the first time point and the period being less than or equal to the fourth time point, that is, the uplink scheduling resources corresponding to the unicast retransmission identifier and the multicast retransmission identifier are both available when the indication message of reception of the retransmission data of the MBS corresponding to the unicast retransmission identifier is generated, then any one of the uplink scheduling resources corresponding to the unicast retransmission identifier and multicast retransmission identifier is determined as the designated uplink scheduling resource with reference to any one of the methods from method 1 to method 7 in the above embodiments.

As an example, in response to the sum of the first time point and the period being less than or equal to the third time point, and the sum of the first time point and the period being greater than the fourth time point, that is, when the indication message of reception of the retransmission data of the MBS corresponding to the unicast retransmission identifier is generated, the uplink scheduling resource corresponding to the unicast retransmission identifier is available, and the uplink scheduling resource corresponding to the multicast retransmission identifier is unavailable, then the uplink scheduling resource corresponding to the unicast retransmission identifier is determined as the designated uplink scheduling resource with reference to any one of the methods from method 1 to method 7 in the above embodiments.

As an example, in response to the sum of the first time point and the period being greater than the third time point, and the sum of the first time point and the period being less than or equal to the fourth time point, that is, when the indication message of reception of the retransmission data of the MBS corresponding to the unicast retransmission identifier is generated, the uplink scheduling resource corresponding to the unicast retransmission identifier is unavailable, and the uplink scheduling resource corresponding to the multicast retransmission identifier is available, then the uplink scheduling resource corresponding to the multicast retransmission identifier is determined as the designated uplink scheduling resource with reference to any one of the methods from method 1 to method 7 in the above embodiments.

Further, in response to the indication message of reception of the retransmission data of the MBS being generated based on a reception state of the retransmission data of the MBS corresponding to the multicast scheduling identifier, the above step 804 may include:

- determining an uplink scheduling resource corresponding to the unicast retransmission identifier as the designated uplink scheduling resource in response to a sum of the second time point and the period being less than or equal to the third time point; or
- determining an uplink scheduling resource corresponding to the multicast retransmission identifier as the designated uplink scheduling resource in response to a sum of the second time point and the period being less than or equal to the fourth time point.

As an example, in response to the sum of the second time point and the period being less than or equal to the third time point, and the sum of the second time point and the period being less than or equal to the fourth time point, that is, when the indication message of reception of the retransmission data of the MBS corresponding to the multicast retransmission identifier is generated, the uplink scheduling resources corresponding to the unicast retransmission identifier and the multicast retransmission identifier are both available, then any one of the uplink scheduling resources corresponding to the unicast retransmission identifier and multicast retransmission identifier is determined as the designated uplink scheduling resource with reference to any one of the methods from method 1 to method 7 in the above embodiments.

As an example, in response to the sum of the second time point and the period being less than or equal to the third time point, and the sum of the second time point and the period being greater than the fourth time point, that is, when the indication message of reception of the retransmission data of the MBS corresponding to the multicast retransmission identifier is generated, the uplink scheduling resource corresponding to the unicast retransmission identifier is available, and the uplink scheduling resource corresponding to the multicast retransmission identifier is unavailable, then the uplink scheduling resource corresponding to the unicast retransmission identifier is determined as the designated uplink scheduling resource with reference to any one of the methods from method 1 to method 7 in the above embodiments.

As an example, in response to the sum of the second time point and the period being greater than the third time point, and the sum of the second time point and the period being greater than the fourth time point, that is, when the indication message of reception of the retransmission data of the MBS corresponding to the multicast retransmission identifier is generated, the uplink scheduling resource corresponding to the unicast retransmission identifier is unavailable, and the uplink scheduling resource corresponding to the multicast retransmission identifier is available, then the uplink scheduling resource corresponding to the multicast retransmission identifier is determined as the designated uplink scheduling resource with reference to any one of the methods from method 1 to method 7 in the above embodiments.

At step 805, an indication message of reception of retransmission data of the MBS is sent to a base station based on a designated uplink scheduling resource.

In embodiments of the present disclosure, the step 805 may be implemented in any of the various embodiments of the present disclosure, which will not be limited in embodiments of the present disclosure, and will not be repeated hereinafter.

According to the method for data retransmission provided by embodiments of the present disclosure, the retransmission data scheduling of the MBS is monitored based on the designated retransmission identifier of the MBS. The designated uplink scheduling resource is determined based on the first time point at which the UE receives the retransmission data of the MBS identified by the unicast retransmission identifier, the second time point at which the UE receives the retransmission data of the MBS identified by the multicast retransmission identifier, the third time point that corresponds to the uplink scheduling resource corresponding to the unicast retransmission identifier, and the fourth time point that corresponds to the uplink scheduling resource corresponding to the multicast retransmission identifier. The indication message of reception of retransmission data of the MBS is sent to the base station based on the designated uplink scheduling resource. Therefore, the UE may determine the designated uplink scheduling resource based on a processing time of the retransmission data and a time position of an uplink scheduling resource corresponding to each retransmission identifier, which may not only achieve retransmission of MBS service data that fails to receive, but also further improve reliability of data transmission.

Figure 9:
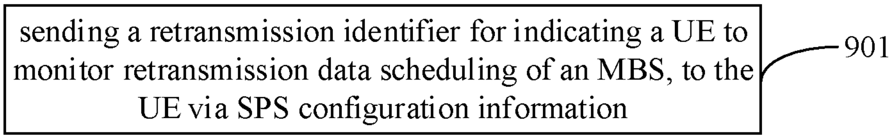
FIG. 9 is a flowchart illustrating a method for data retransmission performed by a base station according to an embodiment of the present disclosure.

FIG. 9 is a flowchart illustrating another method for data retransmission according to an embodiment of the present disclosure. The method is performed by a base station.

As illustrated in FIG. 9, the method for data retransmission includes the following steps.

At step 901, a retransmission identifier for indicating a UE to monitor retransmission data scheduling of an MBS is sent to the UE via SPS configuration information.

It should be noted that the method for data retransmission of an embodiment of the present disclosure may be performed by any base station capable of communicating with the UE. The UE may refer to a device that provides voice and/or data connectivity to a user. The UE may communicate with one or more core networks through a radio access network (RAN). The UE may be an Internet of Things terminal, such as a sensor device, a mobile phone (or called as "cellular" phone), or a computer with the Internet of Things terminal, which may be, for example, a fixed, portable, pocket, handheld, computer built-in, or vehicle mounted device, such as, a station (STA), a subscriber unit, a subscriber station, a mobile station, a mobile platform, a remote station, an access point, a remote terminal, an access terminal, a user terminal, or a user agent. Alternatively, the UE may also be a device of unmanned aerial vehicle. Alternatively, the UE may also be a vehicle mounted device, such as a vehicle computer with wireless communication function or an external wireless terminal connected to the vehicle computer. Alternatively, the UE may also be a roadside device, such as a street light, a signal light, or other roadside device with wireless communication function.

The retransmission identifier may include at least one of following identifiers: a unicast retransmission identifier or a multicast retransmission identifier.

The unicast retransmission identifier may be a CS-RNTI. The multicast retransmission identifier may be an M-CS-RNTI.

The SPS configuration information may include N pieces of MBS service identification information, where N is a positive integer.

The MBS service identification information may include at least one of following information: a carrier identifier corresponding to the MBS, a logical channel identifier (LCID), a cell group identifier, a wireless link control entity identifier, an MBS scheduling identifier, or an MBS service identifier.

The MBS service identifier may include at least one of following information: a TMGI (temporary mobile group identity), an MBS session identity, an MBS service flow identity.

In an embodiment of the present disclosure, the base station may configure the UE with a method for data retransmission of multicast SPS corresponding to the MBS in response to scheduling the MBS by means of the SPS.

As a possible implementation, the base station may configure N multicast SPSs in each cell with respective multicast scheduling identifiers of retransmission data scheduling for the multicast SPSs through the SPS configuration information. Therefore, in response to the SPS configuration information obtained, the UE may monitor the retransmission data scheduling of each service based on the multicast scheduling identifier corresponding to the SPS configured for each service in the MBS.

For example, the base station has configured SPS-1 (such as SPS-1 activated by a PDCCH (Physical Downlink Control Channel) indicated by a multicast scheduling identifier M-CS-RNTI-1) for MBS service-1 in BWP-1 (Bandwidth Part) of cell-1, and SPS-2 (such as SPS-2 activated by a PDCCH indicated by a multicast scheduling identifier M-CS-RNTI-2) for MBS service-2 in BWP-1 of cell-1. Therefore, the UE may take M-CS-RNTI-1 as a multicast retransmission identifier corresponding to MBS service-1, configured for monitoring the data retransmission scheduling of multicast SPS-1, and take M-CS-RNTI-2 as a multicast retransmission identifier corresponding to MBS service-2, configured for monitoring the data retransmission scheduling of multicast SPS-2.

As another possible implementation, the base station may configure N multicast SPSs in each cell with one multicast scheduling identifier of retransmission data scheduling for the multicast SPSs through the SPS configuration information. Therefore, in response to the SPS configuration information obtained, the UE may monitor the retransmission data scheduling of all services of the cell based on the multicast scheduling identifier corresponding to the cell.

For example, the base station configured SPS-1 (such as SPS-1 activated by a PDCCH indicated by a multicast scheduling identifier M-CS-RNTI-1) for MBS service-1 in BWP-1 of cell 1, and SPS-2 (such as SPS-2 activated by a PDCCH indicated by a multicast scheduling identifier M-CS-RNTI-1) for MBS service-2 in BWP-1 of cell 1. Therefore, the UE may take M-CS-RNTI-1 as the multicast retransmission identifier corresponding to MBS service-1 and MBS service-2, configured for monitoring the data retransmission scheduling of multicast SPS-1 and multicast SPS-2, and not configured for the data retransmission scheduling of unicast SPS.

As another possible implementation, the base station may also configure for UE with a specific unicast scheduling identifier, which is configured to monitor the retransmission data scheduling of the multicast SPS, through the SPS configuration information. Therefore, in response to the SPS configuration information obtained, the UE may monitor the retransmission data scheduling of all services in the MBS based on the unicast scheduling identifier included in the SPS configuration information.

For example, the base station configured SPS-1 (such as SPS-1 activated by a PDCCH indicated by a multicast scheduling identifier M-CS-RNTI-1) for MBS service-1 in BWP-1 of cell 1, and SPS-2 (such as SPS-2 activated by a PDCCH indicated by a multicast scheduling identifier M-CS-RNTI-2) for MBS service-2 in BWP-1 of cell 1. At this point, the base station may also configure for cell-1 with one UE specific PDCCH channel indication identifier for the retransmission scheduling of the multicast SPS (such as a unicast scheduling identifier CS-RNTI). Thus, UE may monitor the data retransmission scheduling of multicast SPS-1 and multicast SPS-2 based on CS-RNTI. In addition, CS-RNTI may also be configured for data retransmission scheduling of unicast SPS in cell-1. For example, the base station has configured SPS-3 (such as SPS-3 activated by a PDCCH indicated by a unicast scheduling identifier CS-RNTI) for a unicast service in BWP-1 of cell-1, the UE may also monitor the data retransmission scheduling of unicast SPS-3 based on CS-RNTI.

As another possible implementation, the base station may also configure unicast scheduling identifier and multicast scheduling identifier for UE through the SPS configuration information, therefore, the UE may monitor retransmission data scheduling of the MBS based on both the unicast scheduling identifier and the multicast scheduling identifier.

According to the method for data retransmission provided by embodiments of the present disclosure, the retransmission identifier for indicating the UE to monitor the retransmission data scheduling of the MBS is sent to the UE via the SPS configuration information. Therefore, the base station may configure for the UE with the retransmission identifier for monitoring the retransmission data scheduling of the MBS, causing the UE to monitor the retransmission data scheduling of the MBS, thus achieving retransmission of MBS service data that fails to receive, and improving reliability of data transmission.

In a possible implementation of the present disclosure, the base station may send the retransmission data to the UE when the UE fails to receive MBS data, thus improving the reliability of data transmission.

Figure 10:
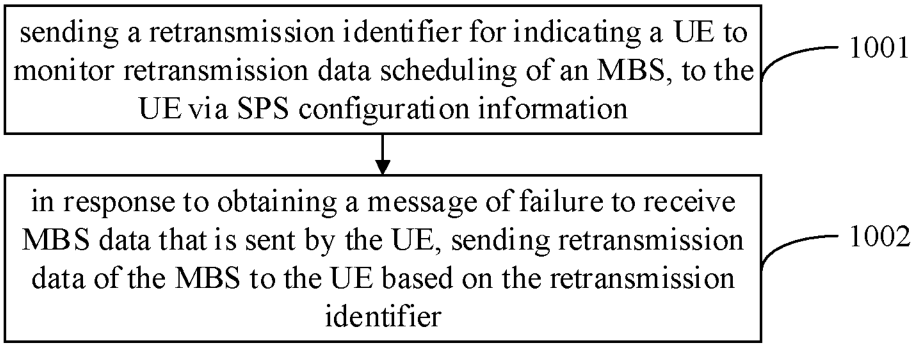
FIG. 10 is a flowchart illustrating another method for data retransmission according to an embodiment of the present disclosure.

In combination with FIG. 10, the following further describes another method for data retransmission according to an embodiment of the present disclosure.

FIG. 10 is a flowchart illustrating another method for data retransmission according to an embodiment of the present disclosure. The method is performed by a base station.

As illustrated in FIG. 10, the method for data retransmission includes the following steps.

At step 1001, a retransmission identifier for indicating a UE to monitor retransmission data scheduling of an MBS is sent to the UE via SPS configuration information.

In embodiments of the present disclosure, the step 1001 may be implemented in any of the various embodiments of the present disclosure, which will not be limited in embodiments of the present disclosure, and will not be repeated hereinafter.

At step 1002, in response to obtaining a message of failure to receive MBS data that is sent by the UE, retransmission data of the MBS is sent to the UE based on the retransmission identifier.

In an embodiment of the present disclosure, in response to failure to receive the MBS data, the UE may send a message of reception failure of MBS data to the base station. Therefore, the base station may, in response to obtaining the message of failure to receive MBS data, send to the UE the retransmission data corresponding to the MBS data that is failure to be received based on the retransmission identifier, to ensure reliable transmission of the MBS data.

Further, the base station may determine the retransmission identifier used for sending the retransmission data of the MBS based on the retransmission identifier configured for the UE. In a possible implementation of an embodiment of the present disclosure, the above step 1002 may include:

sending the retransmission data of the MBS to the UE based on any retransmission identifier; or sending the retransmission data of the MBS to the UE based on the unicast retransmission identifier and the multicast retransmission identifier respectively.

As an example, in response to the base station configuring a specific unicast scheduling identifier for the UE through SPS configuration information in order to monitor retransmission data scheduling of multicast SPS, the base station may send the retransmission data of the MBS to the UE based on the unicast retransmission identifier.

As an example, in response to the base station configuring a specific multicast scheduling identifier for the UE through SPS configuration information in order to monitor retransmission data scheduling of multicast SPS, the base station may send the retransmission data of the MBS to the UE based on the multicast retransmission identifier.

As an example, in response to the base station configuring both a unicast scheduling identifier and a multicast scheduling identifier for the UE through SPS configuration information, the base station may send the retransmission data of the MBS to the UE based on the unicast retransmission identifier and the multicast retransmission identifier, respectively.

It should be noted that in response to the failure to receive retransmission data of MBS, the UE may also send an indication message of failure to receive retransmission data of the MBS to the base station. Therefore, in response to the indication message of failure to receive retransmission data of the MBS, the base station may further send the corresponding retransmission data of the MBS to the base station again based on a retransmission identifier corresponding to the indication message of reception failure of retransmission data, to ensure reliability of data transmission.

According to the method for data retransmission provided in an embodiment of the present disclosure, the retransmission identifier for indicating the UE to monitor the retransmission data scheduling of the MBS is sent to the UE via the SPS configuration information. In response to obtaining the message of failure to receive MBS data that is sent by the UE, the retransmission data of the MBS is sent to the UE based on the retransmission identifier. Therefore, the base station configures the retransmission identifier for monitoring the retransmission data scheduling of MBS for the UE, and sends to the UE retransmission data corresponding to MBS data that fails to receive, such that the UE may monitor the retransmission data scheduling of the MBS, thus achieving retransmission of MBS service data that is fails to receive, further improving reliability of data transmission.

In order to realize the above-mentioned embodiments, the present disclosure also provides an apparatus for data retransmission.

Figure 11:
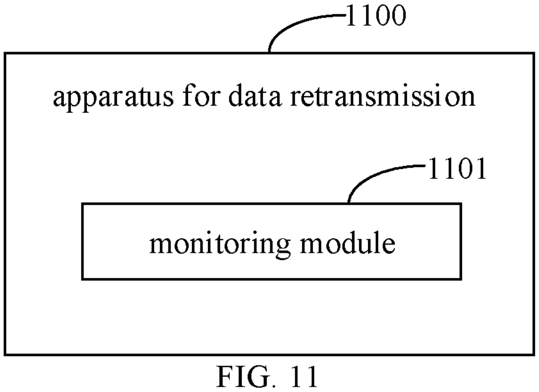
FIG. 11 is a schematic diagram illustrating a structure of an apparatus for data retransmission applicable to a UE according to an embodiment of the present disclosure.

FIG. 11 is a flowchart illustrating an apparatus for data retransmission according to an embodiment of the present disclosure. The apparatus is applicable for a UE.

As illustrated in FIG. 11, the apparatus for data retransmission includes a monitoring module 1101.

The monitoring module 1101 is configured to monitor retransmission data scheduling of a multicast broadcast service (MBS) based on a designated retransmission identifier of the MBS.

In practical implementations, the apparatus for data retransmission provided by embodiments of the present disclosure may be configured in any communication device to perform the aforementioned method for data retransmission.

According to the apparatus for data retransmission provided by embodiments of the present disclosure, the retransmission data scheduling of the MBS is monitored based on the designated retransmission identifier of the MBS. Therefore, the UE may monitor the retransmission data scheduling of the MBS based on the designated retransmission identifier of the MBS in the MBS service, thus achieving retransmission of MBS service data that fails to receive, further improving reliability of data transmission.

In a possible implementation of the present disclosure, the apparatus 1100 for data retransmission further includes:

a first determining module, configured to determine the designated retransmission identifier of the MBS in response to obtained downlink semi-persistent scheduling (SPS) configuration information.

Further, in another possible implementation of the present disclosure, the SPS configuration information includes N pieces of MBS service identification information, where N is a positive integer.

Further, in another possible implementation of the present disclosure, the MBS service identification information includes at least one of following information: a carrier identifier corresponding to the MBS, a logical channel identifier (LCID), a cell group identifier, a wireless link control entity identifier, an MBS scheduling identifier, or an MBS service identifier.

Further, in another possible implementation of the present disclosure, the designated retransmission identifier of the MBS includes at least one of following identifiers: a unicast retransmission identifier or a multicast retransmission identifier.

Further, in another possible implementation of the present disclosure, the monitoring module 1101 includes:

a first monitoring unit, configured to, in response to a failure to receive MBS data, monitor the retransmission data scheduling of the MBS based on the designated retransmission identifier of the MBS.

Further, in another possible implementation of the present disclosure, the first monitoring unit is specifically configured to:

in response to the failure to receive MBS data, monitor the retransmission data scheduling of the MBS based on the designated retransmission identifier of the MBS, upon a period starting from a time point of the failure to receive data being equal to or greater than a predetermined period.

Further, in another possible implementation of the present disclosure, the monitoring module 1101 includes:

a second monitoring unit, configured to, in response to having been sent a message of failure to receive MBS data to a base station, monitoring the retransmission data scheduling of the MBS based on the designated retransmission identifier of the MBS; or a third monitoring unit, configured to, in response to a current received data being MBS data, monitor the retransmission data scheduling of the MBS based on the designated retransmission identifier of the MBS.

Further, in another possible implementation of the present disclosure, the designated retransmission identifier of the MBS includes a unicast retransmission identifier and a multicast retransmission identifier, the monitoring module 1101 includes:

a fourth monitoring unit, configured to monitor the retransmission data scheduling of the MBS based on either the unicast retransmission identifier or the multicast retransmission identifier.

Further, in another possible implementation of the present disclosure, the designated retransmission identifier of the MBS includes a unicast retransmission identifier and a multicast retransmission identifier, the monitoring module 1101 includes:

a first determining unit, configured to, determine a target retransmission identifier based on reception time points of retransmission scheduling indications identified by the unicast retransmission identifier and the multicast retransmission identifier respectively; and a fifth monitoring unit, configured to monitor the retransmission data scheduling of the MBS based on the target retransmission identifier.

Further, in another possible implementation of the present disclosure, the designated retransmission identifier of the MBS includes a unicast retransmission identifier and a multicast retransmission identifier, the monitoring module 1101 includes:

a sixth monitoring unit, configured to monitor the retransmission data scheduling of the MBS respectively based on the unicast retransmission identifier and the multicast retransmission identifier;

a second determining unit, configured to determine retransmission data identified by any retransmission identifier as a target retransmission data in response to a reception time point of the retransmission data identified by any retransmission identifier being earlier than a reception time point of retransmission data identified by another retransmission identifier.

Further, in another possible implementation of the present disclosure, the designated retransmission identifier of the MBS includes a unicast retransmission identifier and a multicast retransmission identifier, the monitoring module 1101 includes:

a seventh monitoring unit, configured to monitor first retransmission data scheduling of the MBS based on the unicast retransmission identifier;

an eighth monitoring unit, configured to monitor second retransmission data scheduling of the MBS based on the multicast retransmission identifier;

a combined decoding unit, configured to perform combined decoding on first retransmission data and second retransmission data.

Further, in another possible implementation of the present disclosure, the designated retransmission identifier of the MBS includes a unicast retransmission identifier and a multicast retransmission identifier, the monitoring module 1101 includes:

a ninth monitoring unit, configured to, in response to successful decoding of retransmission data of the MBS obtained based on any retransmission identifier, stop monitoring retransmission data scheduling of the MBS associated with another retransmission identifier; or a tenth monitoring unit, configured to, in response to decoding failure of the retransmission data of the MBS obtained based on any retransmission identifier, continue to monitor the retransmission data scheduling of the MBS associated with another retransmission identifier.

In a possible implementation of the present disclosure, the apparatus 1100 for data retransmission further includes:

a second sending module, configured to send an indication message of reception of retransmission data of the MBS to a base station based on a designated uplink scheduling resource.

In a possible implementation of the present disclosure, the apparatus 1100 for data retransmission further includes:

a third sending module, configured to send an indication message indicating successful reception of retransmitted data to the base station in response to successful decoding of at least one piece of retransmitted data; or a fourth sending module, configured to send an indication message indicating reception failure of the retransmission data to the base station in response to decoding failure of at least one piece of retransmission data; or a fifth sending module, configured to send an indication message indicating reception failure of the retransmission data to the base station in response to decoding failure of all retransmission data; or a sixth sending module, configured to send an indication message indicating successful reception of any retransmission data to the base station in response to successful decoding of any retransmission data; or a seventh sending module, configured to send an indication message indicating reception failure of any retransmission data to the base station in response to decoding failure of any retransmission data.

In a possible implementation of the present disclosure, the designated retransmission identifier of the MBS includes a unicast retransmission identifier and a multicast retransmission identifier, and the designated uplink scheduling resource is an uplink scheduling resource corresponding to any retransmission identifier.

In a possible implementation of the present disclosure, the designated retransmission identifier of the MBS includes a unicast retransmission identifier and a multicast retransmission identifier, and the apparatus 1100 for data retransmission further includes:

a second determining module, configured to determine the designated uplink scheduling resource based on an order of receiving scheduling instructions identified by the unicast retransmission identifier and the multicast retransmission identifier respectively.

In a possible implementation of the present disclosure, the designated retransmission identifier of the MBS includes a unicast retransmission identifier and a multicast retransmission identifier, and the apparatus 1100 for data retransmission further includes:

a third determining module, configured to determine an uplink scheduling resource corresponding to a retransmission identifier associated with successfully decoded retransmission data as the designated uplink scheduling resource.

In a possible implementation of the present disclosure, the designated retransmission identifier of the MBS includes a unicast retransmission identifier and a multicast retransmission identifier, and the apparatus 1100 for data retransmission further includes:

a fourth determining module, configured to determine an uplink scheduling resource corresponding to any retransmission identifier as the designated uplink scheduling resource in response to successful decoding of retransmission data identified by any retransmission identifier and a reception time of the retransmission data identified by any retransmission identifier being earlier than a reception time of retransmission data identified by another retransmission identifier; or a fifth determining module, configured to determine an uplink scheduling resource corresponding to any retransmission identifier as the designated uplink scheduling resource in response to successful decoding of retransmission data identified by any retransmission identifier and the reception time of the retransmission data identified by any retransmission identifier being later than the reception time of the retransmission data identified by another retransmission identifier; or a sixth determining module, configured to determine an uplink scheduling resource corresponding to any retransmission identifier as the designated uplink scheduling resource in response to decoding failure of retransmission data identified by any retransmission identifier and the reception time of the retransmission data identified by any retransmission identifier being earlier than the reception time of the retransmission data identified by another retransmission identifier; or a seventh determining module, configured to determine an uplink scheduling resource corresponding to any retransmission identifier as the designated uplink scheduling resource in response to decoding failure of retransmission data identified by any retransmission identifier and the reception time of the retransmission data identified by any retransmission identifier being later than the reception time of the retransmission data identified by another retransmission identifier.

In a possible implementation of the present disclosure, the designated retransmission identifier of the MBS includes a unicast retransmission identifier and a multicast retransmission identifier, and the apparatus 1100 for data retransmission further includes:

an eighth determining module, configured to determine a first time point at which the UE receives MBS retransmission data identified by a unicast retransmission identifier, a second time point at which the UE receives the retransmission data of the MBS identified by a multicast retransmission identifier, a third time point of an uplink scheduling resource corresponding to the unicast retransmission identifier, and a fourth time point of an uplink scheduling resource corresponding to the multicast retransmission identifier;

a ninth determining module, configured to determine a period during which the UE processes and generates the indication message of reception of the retransmission data of the MBS; and a tenth determining module, configured to determine the designated uplink scheduling resource based on the first time point, the second time point, the third time point, the fourth time point, and the period.

In a possible implementation of the present disclosure, the tenth determining module includes:

a third determining unit, configured to determine an uplink scheduling resource corresponding to the unicast retransmission identifier as the designated uplink scheduling resource in response to a sum of the first time point and the period being less than or equal to the third time point; or a fourth determining unit, configured to determine an uplink scheduling resource corresponding to the multicast retransmission identifier as the designated uplink scheduling resource in response to a sum of the first time point and the period being less than or equal to the fourth time point; or a sixth determining unit, configured to determine an uplink scheduling resource corresponding to the unicast retransmission identifier as the designated uplink scheduling resource in response to a sum of the second time point and the period being less than or equal to the third time point; or a seventh determining unit, configured to determine an uplink scheduling resource corresponding to the multicast retransmission identifier as the designated uplink scheduling resource in response to a sum of the second time point and the period being less than or equal to the fourth time point.

It should be noted that the above explanation and description of the embodiments of the method for data retransmission shown in FIGS. 1 to 8 also applies to the apparatus 1100 for data retransmission in this embodiment, which will not be repeated herein.

According to the apparatus for data retransmission provided by embodiments of the present disclosure, the retransmission data scheduling of the MBS is monitored based on any one of the unicast retransmission identifier and the multicast retransmission identifier. Therefore, when the designated retransmission identifier of the MBS includes both the unicast retransmission identifier and the multicast retransmission identifier, the UE may monitor the retransmission data scheduling of the MBS by selecting any one of the retransmission identifiers, which may not only achieve retransmission of MBS service data that fails to receive, further improve reliability of data transmission, but also avoid repeated reception of retransmission data and reduce data processing capacity of the UE.

In order to realize the above-mentioned embodiments, the present disclosure also provides an apparatus for data retransmission.

Figure 12:
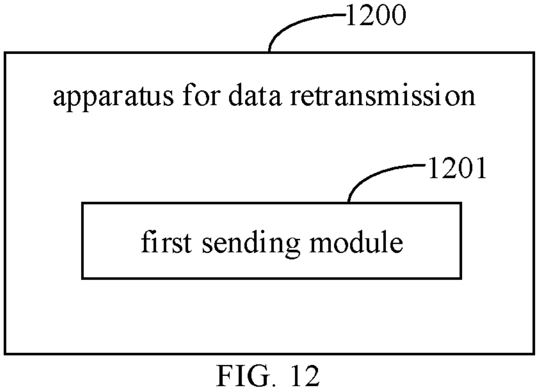
FIG. 12 is a schematic diagram illustrating a structure of an apparatus for data retransmission applicable to a base station according to an embodiment of the present disclosure.

FIG. 12 is a flowchart illustrating an apparatus 1200 for data retransmission according to an embodiment of the present disclosure. The apparatus is applicable for a base station.

As illustrated in FIG. 12, the apparatus 1200 for data retransmission includes a sending module 1201.

The sending module 1201 is configured to send a retransmission identifier for indicating a UE to monitor retransmission data scheduling of an MBS, to the UE via SPS configuration information.

In practical implementations, the apparatus for data retransmission provided by embodiments of the present disclosure may be configured in any communication device to perform the aforementioned method for data retransmission.

According to the apparatus for data retransmission provided by embodiments of the present disclosure, the retransmission identifier for indicating the UE to monitor retransmission data scheduling of the MBS is sent to the UE via the SPS configuration information. Therefore, the base station may configure for the UE with the retransmission identifier for monitoring the retransmission data scheduling of MBS, rendering the UE to monitor the retransmission data scheduling of the MBS, thus achieving retransmission of MBS service data that fails to receive, further improving reliability of data transmission.

In a possible implementation of the present disclosure, the SPS configuration information comprises N pieces of MBS service identification information, where N is a positive integer.

Further, in a possible implementation of the present disclosure, the MBS service identification information includes at least one of following information: a carrier identifier corresponding to the MBS, a logical channel identifier (LCID), a cell group identifier, a wireless link control entity identifier, an MBS scheduling identifier, or an MBS service identifier.

Further, in a possible implementation of the present disclosure, the designated retransmission identifier of the MBS includes at least one of following identifiers: a unicast retransmission identifier or a multicast retransmission identifier.

Further, in a possible implementation of the present disclosure, the apparatus 1200 for data retransmission includes:

a seventh sending module, configured to, in response to obtaining a message of failure to receive MBS data that is sent by the UE, send retransmission data of the MBS to the UE based on the retransmission identifier.

Further, in a possible implementation of the present disclosure, the retransmission identifier comprises a unicast retransmission identifier and a multicast retransmission identifier, and seventh sending module includes:

a first sending unit, configured to send the retransmission data of the MBS to the UE based on any retransmission identifier; or a second sending unit, configured to send the retransmission data of the MBS to the UE based on the unicast retransmission identifier and the multicast retransmission identifier respectively.

It should be noted that the above explanation and description of embodiments of the method for data retransmission shown in FIGS. 9 and 10 is also applicable to the apparatus 1200 for data retransmission of this embodiment, which will not be repeated here.

According to the apparatus for data retransmission provided by embodiments of the present disclosure, the retransmission identifier for indicating the UE to monitor the retransmission data scheduling of the MBS is sent to the UE via the SPS configuration information. In response to obtaining the message of failure to receive MBS data that is sent by the UE, the retransmission data of the MBS is sent to the UE based on the retransmission identifier. Therefore, the base station configures the retransmission identifier for monitoring the retransmission data scheduling of MBS for the UE, and sends to the UE retransmission data corresponding to MBS data that fails to receive, such that the UE may monitor the retransmission data scheduling of the MBS, thus achieving retransmission of MBS service data that is fails to receive, further improving reliability of data transmission.

In order to realize the above-mentioned embodiments, the present disclosure also provides a communication device.

The communication device provided in an embodiment of the present disclosure includes a processor, a transceiver, a memory, and an executable program stored in the memory and capable of being run by the processor, in which the processor is configured to execute the method for data retransmission provided by any one of the above-mentioned implementations when running the executable program.

The communication device may be the above-mentioned UE or based station.

The processor may include various types of storage medium, which are non-transitory computer storage medium that may continue to memorize information stored thereon after the communication device is powered down. Here, the communication device includes a UE or a based station.

The processor may be connected to the memory through a bus or the like, for reading the executable program stored on the memory, for example, as shown in at least one of FIGS. 1 to 10.

In order to realize the above-mentioned embodiments, the present disclosure also provides a computer storage medium.

The computer storage medium provided in the embodiment of the present disclosure having stored therein executable programs that, when executed by a processor, cause the method for data retransmission provided by any one of the above-mentioned implementations to be implemented.

Figure 13:
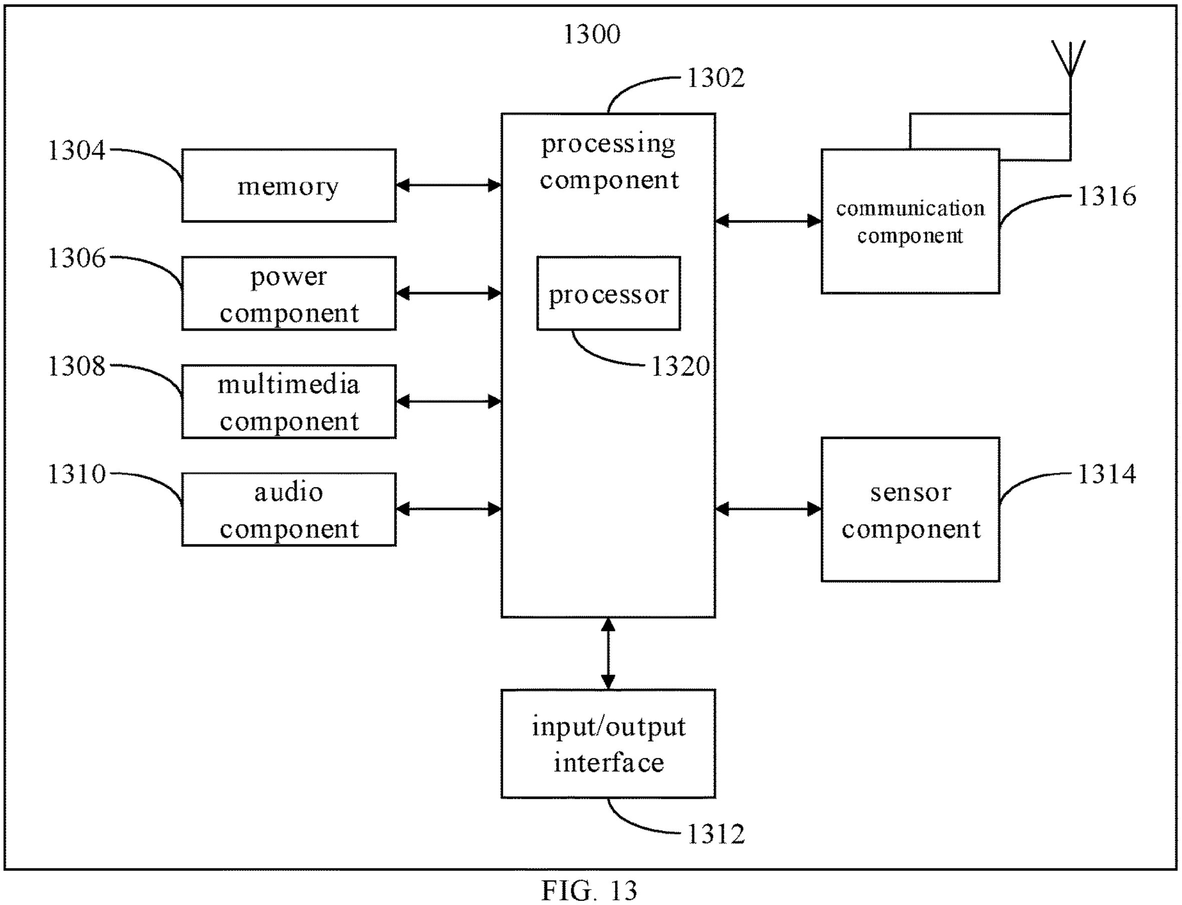
FIG. 13 is a block diagram illustrating a user equipment according to an embodiment of the present disclosure.

FIG. 13 is a block diagram of a user equipment (UE) 1300 provided in an embodiment of the present disclosure. For example, the UE 1300 can be a mobile phone, a computer, a digital broadcast user equipment, a messaging device, a game console, a tablet device, a medical device, a fitness device, a personal digital assistant, or the like.

Referring to FIG. 13, the UE 1300 may include at least of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the UE 1300, such as the operations associated with display, phone calls, data communications, camera operations, and recording operations. The processing component 1302 can include at least one processor 1320 to execute instructions to perform all or some of the steps in the above-described methods. Moreover, the processing component 1302 may include at least one module which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the UE 1300. Examples of such data include instructions for any applications or methods operated on the UE 1300, contact data, phonebook data, messages, pictures, videos, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the UE 1300. The power component 1306 may include a power management system, at least one power source, and any other components associated with the generation, management, and distribution of power in the UE 1300.

The multimedia component 1308 includes a screen providing an output interface between the UE 1300 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake up time and a pressure associated with the touch or swipe action. In some embodiments, the multimedia component 1308 includes a front camera and/or a rear camera. The front camera and/or the rear camera may receive an external multimedia datum while the user equipment 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone (MIC) configured to receive an external audio signal when the user equipment 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as keyboards, click wheels, buttons, and the like. The buttons may include, but are not limited to, a home button, a volume button, a starting button, and a locking button.

The sensor component 1314 includes at least one sensor to provide status assessments of various aspects of the UE 1300. For instance, the sensor component 1314 may detect an open/closed status of the UE 1300, relative positioning of components, e.g., the display and the keypad, of the UE 1300, a change in position of the UE 1300 or a component of the UE 1300, a presence or absence of user contact with the UE 1300, an orientation or an acceleration/deceleration of the UE 1300, and a change in temperature of the UE 1300. The sensor component 1314 may include a proximity sensor configured to detect the presence of nearby objects without any physical contact. The sensor component 1314 may further include a light sensor, such as a CMOS or CCD image sensor, for use in imaging applications. In some embodiments, the sensor component 1314 may further include an accelerometer sensor, a gyroscope sensor, a magnetic sensor, a pressure sensor, or a temperature sensor.

The communication component 1316 is configured to facilitate communication, wired or wireless, between the UE 1300 and other devices. The UE 1300 can access a wireless network based on a communication standard, such as WiFi, 2G, or 3G, or a combination thereof. In an illustrative embodiment, the communication component 1316 receives a broadcast signal or broadcast associated information from an external broadcast management system via a broadcast channel. In an illustrative embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the UE 1300 may be implemented with at least one application specific integrated circuit (ASIC), a digital signal processor (DSP), a digital signal processing device (DSPD), a programmable logic device (PLD), a field programmable gate array (FPGA), a controller, a micro-controller, a microprocessor, or other electronic elements, for performing the above-mentioned method.

In an illustrative embodiment, there is also provided a non-transitory computer readable storage medium including instructions, such as included in the memory 1304, executable by the processor 1320 in the UE 1300, for completing the above-mentioned method. For example, the non-transitory computer-readable storage medium may be a ROM, a random access memory (RAM), a CD-ROM, a magnetic tape, a floppy disc, an optical data storage device, and the like.

Figure 14:
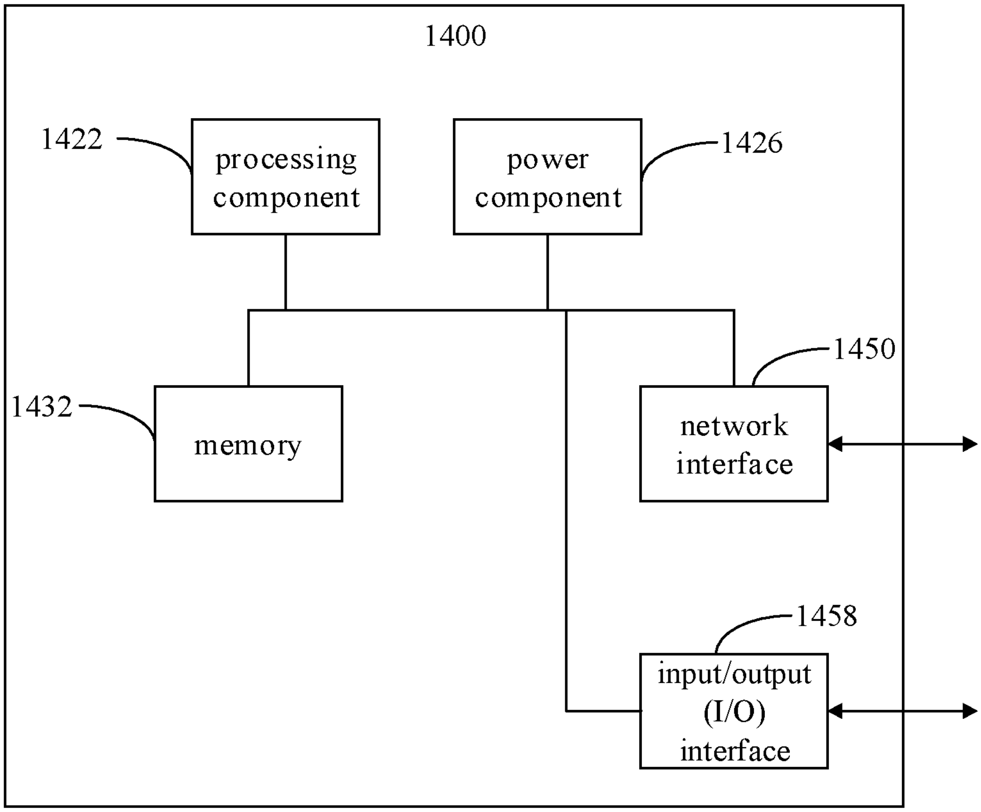
FIG. 14 is a schematic diagram illustrating a structure of a base station according to an embodiment of the present disclosure.

As shown in FIG. 14, FIG. 14 is a schematic diagram showing a base station provided in an embodiment of the present disclosure. For example, the apparatus 1200 may be provided as a network device. Referring to FIG. 14, the base station 1400 includes a processing component 1422, which further includes at least one processor, and memory resources represented by a memory 1432 for storing instructions executable by the processing component 1422, such as an application program. The application program stored in the memory 1432 may include one or more modules each corresponding to a set of instructions. In addition, the processing component 1422 is configured to execute instructions to perform any one of the above-mentioned methods performed by the base station, for example, the method shown in FIG. 9 or FIG. 10.

The base station 1400 may further include a power component 1426 configured to perform power management of the base station 1400, a wired or wireless network interface 1450 configured to connect the base station 1400 to a network, and an input/output (I/O) interface 1458. The base station 1400 may operate based on an operating system stored in the memory 1432, such as Windows Server™, Mac OS X™, Unix™, Linux™, FreeBSD™, or the like.

Other embodiments of the disclosure will be apparent to those skilled in the art from consideration of the specification and practice of the disclosure disclosed here. The present disclosure is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for data retransmission, performed by a user equipment (UE), comprising:

in response to a failure to receive MBS data, monitoring retransmission data scheduling of a multicast broadcast service (MBS) based on a designated retransmission identifier of the MBS, wherein the designated retransmission identifier of the MBS comprises a unicast retransmission identifier and a multicast retransmission identifier and wherein the monitoring occurs upon a period starting from a time point of the failure to receive the MBS data being equal to a predetermined period;

determining a designated uplink scheduling resource based on an order of receiving scheduling instructions identified by the unicast retransmission identifier and the multicast retransmission identifier respectively; and sending an indication message of reception of retransmission data of the MBS identified by a retransmission identifier corresponding to the designated uplink scheduling resource to a base station based on the designated uplink scheduling resource.

2. The method of claim 1, further comprising:

determining the designated retransmission identifier of the MBS in response to obtained downlink semi-persistent scheduling (SPS) configuration information.

3. The method of claim 1, wherein the designated retransmission identifier of the MBS comprises at least one of following identifiers: a unicast retransmission identifier or a multicast retransmission identifier.

4. The method of claim 1, wherein monitoring the retransmission data scheduling of the MBS based on the designated retransmission identifier of the MBS comprises:

in response to having been sent a message of failure to receive MBS data to a base station, monitoring the retransmission data scheduling of the MBS based on the designated retransmission identifier of the MBS; or in response to a current received data being MBS data, monitoring the retransmission data scheduling of the MBS based on the designated retransmission identifier of the MBS.

5. The method of claim 1, wherein, the designated retransmission identifier of the MBS comprises a unicast retransmission identifier and a multicast retransmission identifier, and monitoring the retransmission data scheduling of the MBS based on the designated retransmission identifier of the MBS comprises at least one of:

monitoring the retransmission data scheduling of the MBS based on either the unicast retransmission identifier or the multicast retransmission identifier; or determining a target retransmission identifier based on reception time points of retransmission scheduling indications identified by the unicast retransmission identifier and the multicast retransmission identifier respectively, and monitoring the retransmission data scheduling of the MBS based on the target retransmission identifier; or monitoring the retransmission data scheduling of the MBS respectively based on the unicast retransmission identifier and the multicast retransmission identifier, and determining retransmission data identified by any retransmission identifier as a target retransmission data in response to a reception time point of the retransmission data identified by any retransmission identifier being earlier than a reception time point of retransmission data identified by another retransmission identifier; or monitoring first retransmission data scheduling of the MBS based on the unicast retransmission identifier, monitoring second retransmission data scheduling of the MBS based on the multicast retransmission identifier, and performing combined decoding on first retransmission data and second retransmission data.

6. The method of claim 1, wherein, the designated retransmission identifier of the MBS comprises a unicast retransmission identifier and a multicast retransmission identifier, and monitoring the retransmission data scheduling of the MBS based on the designated retransmission identifier of the MBS comprises:

in response to successful decoding of retransmission data of the MBS obtained based on any retransmission identifier, stopping monitoring retransmission data scheduling of the MBS associated with another retransmission identifier; or in response to decoding failure of the retransmission data of the MBS obtained based on any retransmission identifier, continuing to monitor the retransmission data scheduling of the MBS associated with another retransmission identifier.

7. The method of claim 1, further comprising:

sending an indication message indicating successful reception of retransmission data to the base station in response to successful decoding of at least one piece of retransmitted data; or sending an indication message indicating reception failure of the retransmission data to the base station in response to decoding failure of at least one piece of retransmission data; or sending an indication message indicating reception failure of the retransmission data to the base station in response to decoding failure of all retransmission data; or sending an indication message indicating successful reception of any retransmission data to the base station in response to successful decoding of any retransmission data; or sending an indication message indicating reception failure of any retransmission data to the base station in response to decoding failure of any retransmission data.

8. The method of claim 1, wherein the designated uplink scheduling resource is an uplink scheduling resource corresponding to any retransmission identifier.

9. The method of claim 1, wherein the method further comprises:

determining a first time point at which the UE receives MBS retransmission data identified by a unicast retransmission identifier, a second time point at which the UE receives the MBS retransmission data identified by a multicast retransmission identifier, a third time point of an uplink scheduling resource corresponding to the unicast retransmission identifier, and a fourth time point of an uplink scheduling resource corresponding to the multicast retransmission identifier;

determining a period during which the UE processes and generates the indication message of reception of the MBS retransmission data; and determining the designated uplink scheduling resource based on the first time point, the second time point, the third time point, the fourth time point, and the period.

10. The method of claim 9, wherein determining the designated uplink scheduling resource based on the first time point, the second time point, the third time point, the fourth time point, and the period comprises:

determining an uplink scheduling resource corresponding to the unicast retransmission identifier as the designated uplink scheduling resource in response to a sum of the first time point and the period being less than or equal to the third time point; or determining an uplink scheduling resource corresponding to the multicast retransmission identifier as the designated uplink scheduling resource in response to a sum of the first time point and the period being less than or equal to the fourth time point; or determining an uplink scheduling resource corresponding to the unicast retransmission identifier as the designated uplink scheduling resource in response to a sum of the second time point and the period being less than or equal to the third time point; or determining an uplink scheduling resource corresponding to the multicast retransmission identifier as the designated uplink scheduling resource in response to a sum of the second time point and the period being less than or equal to the fourth time point.

11. A method for data retransmission, performed by a base station, comprising:

in response to obtaining a message of failure to receive MBS data that is sent by a UE, sending retransmission data of the MBS to the UE based on a designated retransmission identifier, wherein the designated retransmission identifier comprises a unicast retransmission identifier and a multicast retransmission identifier, and wherein the retransmission data scheduling is monitored by the UE upon a period starting from a time point of the failure to receive data being equal to a predetermined period;

sending the designated retransmission identifier for indicating the UE to monitor retransmission data scheduling of an MBS, to the UE via SPS configuration information; and receiving an indication message of reception of retransmission data of the MBS identified by a retransmission identifier corresponding to a designated uplink scheduling resource from the UE based on the designated uplink scheduling resource;

wherein the designated uplink scheduling resource is determined based on an order of receiving scheduling instructions identified by the unicast retransmission identifier and the multicast retransmission identifier respectively.

12. The method of claim 11, wherein sending the retransmission data of the MBS to the UE based on the designated retransmission identifier comprises:

sending the retransmission data of the MBS to the UE based on any retransmission identifier; or sending the retransmission data of the MBS to the UE based on the unicast retransmission identifier and the multicast retransmission identifier respectively.

13. A communication device, comprising: a transceiver; a memory; a processor, respectively coupled to the transceiver and the memory, and configured to control wireless signal transmission and reception of the transceiver by executing computer executable instructions on the memory, and capable of implementing:

in response to a failure to receive MBS data, monitoring retransmission data scheduling of a multicast broadcast service (MBS) based on a designated retransmission identifier of the MBS, wherein the designated retransmission identifier of the MBS comprises a unicast retransmission identifier and a multicast retransmission identifier and wherein the monitoring occurs upon a period starting from a time point of the failure to receive the MBS data being equal to a predetermined period;

determining a designated uplink scheduling resource based on an order of receiving scheduling instructions identified by the unicast retransmission identifier and the multicast retransmission identifier respectively; and sending an indication message of reception of retransmission data of the MBS identified by a retransmission identifier corresponding to the designated uplink scheduling resource to a base station based on the designated uplink scheduling resource.

* * * * *